United States Patent
Suzaki

(10) Patent No.: US 7,245,740 B2
(45) Date of Patent: Jul. 17, 2007

(54) ELECTRONIC WATERMARK EMBEDDING DEVICE, ELECTRONIC WATERMARK DETECTION DEVICE, ELECTRONIC WATERMARK EMBEDDING METHOD, AND ELECTRONIC WATERMARK DETECTION METHOD

(75) Inventor: Masahiko Suzaki, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 818 days.

(21) Appl. No.: 10/609,571

(22) Filed: Jul. 1, 2003

(65) Prior Publication Data

US 2005/0018845 A1    Jan. 27, 2005

(51) Int. Cl.
G06K 9/00 (2006.01)
G06K 9/34 (2006.01)
G06K 15/00 (2006.01)
H04N 1/38 (2006.01)
H04L 9/00 (2006.01)

(52) U.S. Cl. .............. 382/100; 382/176; 358/3.28; 358/464; 713/176

(58) Field of Classification Search .............. 382/100, 382/173, 176; 358/3.28, 462, 464; 713/176
See application file for complete search history.

(56) References Cited

U.S. PATENT DOCUMENTS

| | | | | |
|---|---|---|---|---|
| 5,315,098 A | * | 5/1994 | Tow | 235/494 |
| 5,576,532 A | * | 11/1996 | Hecht | 235/494 |
| 5,751,854 A | * | 5/1998 | Saitoh et al. | 382/218 |
| 5,767,978 A | * | 6/1998 | Revankar et al. | 358/296 |
| 5,864,742 A | * | 1/1999 | Gasper et al. | 399/366 |
| 5,949,055 A | * | 9/1999 | Fleet et al. | 235/469 |
| 6,002,493 A | * | 12/1999 | Case | 358/3.06 |
| 6,731,775 B1 | * | 5/2004 | Ancin | 382/100 |
| 6,763,121 B1 | * | 7/2004 | Shaked et al. | 382/100 |
| 6,782,116 B1 | * | 8/2004 | Zhao et al. | 382/100 |
| 6,954,542 B2 | * | 10/2005 | Miyake et al. | 382/100 |

(Continued)

FOREIGN PATENT DOCUMENTS

JP    09 179494    7/1997

(Continued)

*Primary Examiner*—Andrew W. Johns
*Assistant Examiner*—Anthony Mackowey
(74) *Attorney, Agent, or Firm*—Venable LLP; Michael A. Sartori; Kyle D. Petaja

(57) ABSTRACT

To provide an electronic watermark embedding device for improving accuracy when classified information is being detected. The watermark image forming section 1006 creates a watermark image based on classified information 1004 with reference to the document image. For the document image, embedding regions for embedding a dot pattern which is identifiable as a prescribed symbol by a prescribed filter are detected, and a determination is made as to whether or not the proportion of the text region to the embedding region is less than or equal to a prescribed threshold value, and if the proportion of the text region is less than or equal to the prescribed threshold value, a prescribed number of dot patterns in which a symbol formed of at least a portion of the classified information is identifiable (symbol unit) is embedded in a region where the embedding region and the text region do not overlap. Because classified information is embedded only in regions that do not overlap with the text region by using the document image as a reference, embedding of classified information can be ensured regardless of the form of the original document.

14 Claims, 31 Drawing Sheets

U.S. PATENT DOCUMENTS

| | | |
|---|---|---|
| 7,085,399 B2 | 8/2006 | Suzaki |
| 2001/0028727 A1* | 10/2001 | Naito et al. ................. 382/100 |
| 2001/0030761 A1* | 10/2001 | Ideyama ..................... 358/1.9 |
| 2002/0054356 A1* | 5/2002 | Kurita et al. ............... 358/3.28 |
| 2002/0054680 A1* | 5/2002 | Huang et al. ................. 380/54 |
| 2002/0105679 A1* | 8/2002 | Haynes ....................... 358/3.28 |
| 2002/0114490 A1* | 8/2002 | Taniguchi et al. .......... 382/100 |
| 2002/0122568 A1* | 9/2002 | Zhao ........................... 382/100 |
| 2002/0180995 A1* | 12/2002 | Yen et al. .................... 358/1.9 |
| 2003/0002708 A1* | 1/2003 | Pasqua ........................ 382/100 |
| 2003/0133163 A1* | 7/2003 | Wang et al. ................ 358/3.28 |
| 2003/0210803 A1* | 11/2003 | Kaneda et al. .............. 382/100 |

FOREIGN PATENT DOCUMENTS

| | | |
|---|---|---|
| JP | 10 200743 | 7/1998 |
| JP | 2001 053954 | 2/2001 |
| JP | 2001 078006 | 3/2001 |

* cited by examiner (1) UNIT A (2) UNIT B

UNIT E (1)

UNIT A (2)

UNIT B (3)

FIG.6

| 0 | 2 | 0 | 0 |
|---|---|---|---|
| 0 | 0 | 0 | 0 |

UNIT PATTERN REPRESENTING SYMBOL 0

| 0 | 0 | 0 | 2 |
|---|---|---|---|
| 2 | 0 | 0 | 0 |

UNIT PATTERN REPRESENTING SYMBOL 0

(1)

| 1 | 2 | 1 | 1 |
|---|---|---|---|
| 1 | 1 | 2 | 1 |

UNIT PATTERN REPRESENTING SYMBOL 1

| 2 | 1 | 1 | 1 |
|---|---|---|---|
| 1 | 1 | 1 | 1 |

UNIT PATTERN REPRESENTING SYMBOL 1

(2)

| 0 | 1 | 2 | 0 |
|---|---|---|---|
| 2 | 1 | 0 | 2 |

UNIT PATTERN REPRESENTING SYMBOL 2

| 0 | 1 | 2 | 2 |
|---|---|---|---|
| 2 | 2 | 1 | 0 |

UNIT PATTERN REPRESENTING SYMBOL 2

(3)

| 0 | UNIT A (SYMBOL 0) |
| 1 | UNIT B (SYMBOL 1) |
| 2 | UNIT E (SYMBOL 2 (BACKGROUND SYMBOL)) |

(1)

(2)

SYMBOL UNIT ARRANGEMENT DETERMINING MATRIX (3)

(1)

(2)

UNIT PATTERN ARRANGEMENT DETERMINING MATRIX (3)

SYMBOL OF
CODEWORD

UNIT PATTERN
ARRANGEMENT
DETERMINING MATRIX

UNITPAT TERN
MATRIX

FIG.11

| 1111 | 1111 | 1111 | 1111 |
|------|------|------|------|
| 0011 | 0010 | 1001 | 1110 |
| 0000 | 0000 | 1001 | 1110 |
| 0011 | 0000 | 0001 | 1110 |
| 0010 | 0000 | 0000 | 0100 |
| 0010 | 0001 | 1100 | 0100 |

SYMBOL UNIT ARRANGEMENT DETERMINING MATRIX

→

| 2 2 ...... | 2 2 ... 2 | ... 2 2 ... | ............ 2 |
|------|------|------|------|
| 2222 | 2222 | ... 2 2 1 | ............ 2 |
| 2 2 ...... | 2222 | 2222 | ............ 2 |
| 2 2 ... 2 | 2222 | 2222 | 2 ... 2 2 |
| 2 2 ... 2 | 2 2 2 ... | ...... 2 2 | 2 ... 2 2 |

UNIT MATRIX (1) Step 1

| 0 2 0 1 |
|---------|
| 2 2 2 1 |
| 2 2 2 2 |

UNIT PATTERN MATRIX

→

| 0000 | ............ | 0000 | 1111 |
|------|------|------|------|
| 2200 | 2 2 ... 2 | 0220 | 1112 |
| 2222 | 2222 | ... 2 2 ... | 1112 |
| 2 2 ...... | 2222 | 2 2 2 ... | 1112 |
| 2 2 ... 2 | 2222 | 2222 | 2 ... 2 2 |
| 2 2 ... 2 | 2 2 2 ... | ...... 2 2 | 2 ... 2 2 |

UNIT MATRIX (2) Step 2

| 1111 | 1111 | 1111 | 1111 |
|------|------|------|------|
| 0011 | 0010 | 1001 | 1110 |
| 0000 | 0000 | 1001 | 1110 |
| 0011 | 0000 | 0001 | 1110 |
| 0010 | 0000 | 0000 | 0100 |
| 0010 | 0001 | 1100 | 0100 |

SYMBOL UNIT ARRANGEMENT DETERMINING MATRIX

→

| 0000 | 0101 | 0000 | 1111 |
|------|------|------|------|
| 2200 | 2 2 ... 2 | 0220 | 1112 |
| 2222 | 2222 | 0221 | 1112 |
| 2201 | 2222 | 2 2 2 ... | 1112 |
| 2202 | 2222 | 2222 | 2022 |
| 2212 | 2 2 2 ... | 0122 | 2122 |

UNIT MATRIX (3) Step 3

| 0000 | 0101 | 0000 | 1111 |
|------|------|------|------|
| 2200 | 2222 | 0220 | 1112 |
| 2222 | 2222 | 0221 | 1112 |
| 2201 | 2222 | 2222 | 1112 |
| 2202 | 2222 | 2222 | 2022 |
| 2212 | 2222 | 0122 | 2122 |

UNIT MATRIX (4) Step 4

```
0 0 0 0 | 0 1 0 1 | 0 0 0 0 | 1 1 1 1
2 2 0 0 | 2 2 2 2 | 0 2 2 0 | 1 1 1 2
--------+---------+---------+--------
2 2 2 2 | 2 2 2 2 | 0 2 2 1 | 1 1 1 2
2 2 0 1 | 2 2 2 2 | 2 2 2 2 | 1 1 1 2
--------+---------+---------+--------
2 2 0 2 | 2 2 2 2 | 2 2 2 2 | 2 0 2 2
2 2 1 2 | 2 2 2 2 | 0 1 2 2 | 2 1 2 2
```

(1) UNIT MATRIX

▨ UNIT A (SYMBOL "0")
■ UNIT B (SYMBOL "1")
☐ UNIT E (BACKGROUND SYMBOL "2")

(2) IMAGE (BACKGROUND IMAGE) WITH UNIT PATTERN INSERTED (3) WATERMARKED IMAGE WITH DOCUMENT IMAGE AND BACKGROUND IMAGE SUPERPOSED

2 OR MORE ELEMENTS ARE RETRIEVED.

THE SYMBOLS THAT HAVE BEEN RETRIEVED ARE COMBINED.

INPUT IMAGE (1) → DIVISION INTO BLOCKS (2) → UNIT EXTRACTION IMAGE (3)

TEXT REGION EXTRACTION IMAGE (1)   UNIT EXTRACTION IMAGE (2)   DIFFERENCE IMAGE (3)

(1) INPUT IMAGE (2) BINARY IMAGE

TEXT REGION
EXTRACTION IMAGE
(3)

(4) INPUT IMAGE (5) DIVISION INTO BLOCKS

UNIT EXTRACTION
IMAGE
(6)

TEXT REGION
EXTRACTION IMAGE
(7)

UNIT EXTRACTION
IMAGE
(8)

DIFFERENCE IMAGE
(9)

ELECTRONIC WATERMARK EMBEDDING DEVICE, ELECTRONIC WATERMARK DETECTION DEVICE, ELECTRONIC WATERMARK EMBEDDING METHOD, AND ELECTRONIC WATERMARK DETECTION METHOD

BACKGROUND OF THE INVENTION

This invention pertains to an electronic watermark embedding/detection technology for determining whether or not changes have been made to an original, and for specifying the location of the changes, when changes such as text string addition or deletion have been made to a printed document which has been watermarked, by inputting the document into a computer using a scanner or the like, and then processing the document.

DESCRIPTION OF THE RELATED ART

An "electronic watermark" is information for preventing duplication or counterfeiting, or classified information which is embedded in image or document data or the like in a form which is not visible to the human eye. This watermarking presumes that all recording and transfer of data occurs in an electronic medium, and because deterioration or loss of information embedded by watermarking cannot occur, the information can be detected with certainty. Similarly, in order to prevent a document that has been printed on a paper medium from being illegally altered with or copied, a method for embedding into a print document, classified information other than text which is not visually offensive and which easily makes alteration impossible, is required.

The following technologies are known as methods for embedding electronic watermarks into black and white binary documents which are most widely used as printed materials.

[1] Japanese Patent Laid-Open Publication No. 9-179494 "Secret Information Recording Method"

This method assumes that printing is carried out on a printer of 400 dpi or higher. The information is in the form of numerical values, and the information is displayed by the distance (number of dots) between a reference point mark and a position determining mark.

[2] Japanese Patent Laid-Open Publication No. 2001-78006 "Detection Method and Device for Embedding Watermark Information on a Black and White Binary Document Image"

The smallest rectangle containing a arbitrary selected text string is divided into a number of blocks and separated into 2 groups (Group 1 and Group 2). (3 or more groups are also possible.) In the case, for example where the symbol is 1, the characteristic amount in the blocks of Group 1 is increased, and the characteristic amount of each of the blocks in Group 2 is decreased. In the case where the signal is zero, the opposite operation is done. Examples of the characteristic amount of the block include pixel number and the text size of the text region, and the distance to the contact point with the first text region when the block is scanned vertically.

[3] Japanese Patent Laid-Open Publication No. 2001-53954 "Information Embedding Device, Information Reading Device, Electronic Watermarking System, Information Embedding Method, Information Reading Method, and Recording Medium"

The height and width of the smallest rectangle containing one character is set as the characteristic amount for that text, and a symbol is displayed by the classification pattern of the characteristic amount magnitude relation between 2 or more characters. For example, 6 characteristic amounts can be defined using 3 characters, and by enumerating the combinations of these magnitude relational patterns, these combinations can be divided into 2 groups, and a symbol can be assigned to each group. In the case where the embedded information is the symbol 0 and the combination pattern of the characteristic amount for the character selected for displaying the embedded information is symbol 1, one of the 6 characteristic amounts can be changed by expanding the character (text) region or the like. The pattern for change is selected such that the change amount is a minimum.

[4] Japanese Patent Application No. 10-200743 "Text Processing Device"

Information is expressed based on whether or not screen lines of a mansen-screen (a special type of screen formed of fine parallel lines) can be moved in the rear direction.

Incidentally, in the case where changes such as the overwriting or erasing of texts in the printed document occurs, it is necessary to compare the printed document with the original in order to determine the location of the changes. In the case where the changes are handwritten or the like, because this is so different from the printed texts, the location of the changes can be quickly identified, but in the case where overwriting and printing are done in the same font as the original, it is difficult to identify the location of the changes. Prior art examples [1]-[4] include methods in which a determination as to whether there has been alteration can be made when the information embedded in the printed document can no longer be correctly read, but detection accuracy is not high in cases where the information cannot be read because the surface of the paper is smudged, or when there is static at the time of printing.

SUMMARY OF THE INVENTION

This invention was developed in view of the problems of the conventional technology for embedding/detecting electronic watermarks, and an object of the invention is to make it possible to improve the accuracy with which the classified information is detected, and to provide a new and improved electronic watermark embedding device, electronic watermark detection device, electronic watermark embedding method, and electronic watermark detecting method.

Means for Solving the Problem

In order to solve the problems, according to the first aspect of this invention, an electronic watermark embedding device is provided in which classified information is embedded in a document image by using electronic watermarks. The electronic watermark embedding device of this invention comprises a watermark image forming section which refers to the document image and creates watermark images based on the classified information, and for the document image, the watermark image forming section calculates an embedding region for embedding a prescribed dot patterns in which a prescribed symbol can be identified by a prescribed filter, and determines whether or not the proportion of the text region with respect to the embedding region is less than or equal to a prescribed threshold value, and in the case where the proportion of the text region is less than or equal to the prescribed threshold value, dot pattern in which a prescribed symbol formed of at least a portion of the classified information can be identified (symbol unit), is embedded in a prescribed number in a region where the embedding region and the text region do not overlap.

In addition, in order to solve the problems, according to the second aspect of this invention, an electronic watermark detection device is provided which detects classified information which has been embedded by electronic watermarking in the document image. In the electronic watermark detection device of this invention, the document image is divided into a number of embedding regions for embedding a dot pattern in which a prescribed symbol is identifiable using a prescribed filter, and a dot pattern in which the identifiable symbol forms at least a portion of the classified information (symbol unit), or a dot pattern which is a symbol unrelated to the classified information (background unit) is embedded in each of the embedding regions, and classified information is thereby embedded.

In addition to the watermark detection section which detects the classified information, the watermark detection section also includes a plurality of different types of filters which can identify a prescribed symbol from the dot pattern, and matches each of the embedding regions using the plurality of different types of filters, and detects at least a portion of the classified information corresponding to one filter whose output value is much larger than that of the other filter output values from the embedding region having the one filter.

Also, in order to solve the problems, according to the third aspect of this invention, an electronic watermark embedding method in which classified information is embedded in the document image by electronic watermarks. The electronic watermark embedding method of this invention comprises the following five steps.
1. A first step of dividing the document image into a plurality of embedding regions for embedding a dot pattern in which a prescribed symbol can be identifiable by a prescribed filter.
2. A second step of determining whether or not the proportion of the text region is less than or equal to a prescribed threshold value for each of the embedding regions.
3. A third step of a prescribed embedding of a dot pattern in which an identifiable symbol forms at least a portion of the classified information (symbol unit) in a region where the embedding region and the text region do not overlap, in the case where the proportion of the text region is less than or equal to the prescribed threshold value.
4. A fourth step of embedding a plurality of different types and a prescribed number at a time of the symbol units in a region where the embedding region and the text region do no overlap, in the case where the proportion of the text region exceeds the prescribed threshold value.
5. A fifth step of embedding a dot pattern which is a symbol unrelated to the classified information (background unit) in a region where embedding region and the text region overlaps.

Also, according to the fourth aspect of the invention, a method for detecting an electronic watermark is provided in which classified information embedded in a document image by watermarking is detected. In the electronic watermark detection method of this invention, the document image is divided into a plurality of embedding regions for embedding a dot pattern in which a prescribed symbol is identifiable by a prescribed filter. The classified information is embedded by a dot pattern in which a symbol formed of at least a portion of the classified information is identifiable (symbol unit), or a dot pattern which is a symbol unrelated to the classified information (background unit), being embedded in each of the embedding regions.

In addition, matching is done for each of the embedding regions by a plurality of different types of filter, and in the embedding region with one filter output value which is much larger than that of the other filter output values, at least a portion of the classified information corresponding to the one filter is detected, and the classified information is not detected in the embedding region in which there is no difference between each of the filter output values.

BRIEF DESCRIPTION OF THE DRAWING

FIG. 6 is an explanatory diagram showing an example of a unit pattern.

FIG. 11 is an explanatory diagram showing an example of the unit pattern matrix.

DETAILED DESCRIPTION OF THE PREFERRED EMBODIMENTS

Preferable embodiments of the electronic watermark embedding device, the electronic watermark detection device, the electronic watermark embedding method, and the electronic watermark detection method of this invention will be described in detail with reference to the accompanying drawings. It is to be noted that in this specification and drawings, the structural elements that have essentially the same functional structure have been assigned the same reference numbers and repeated descriptions thereof have been omitted.

First Embodiment

Figure 1:
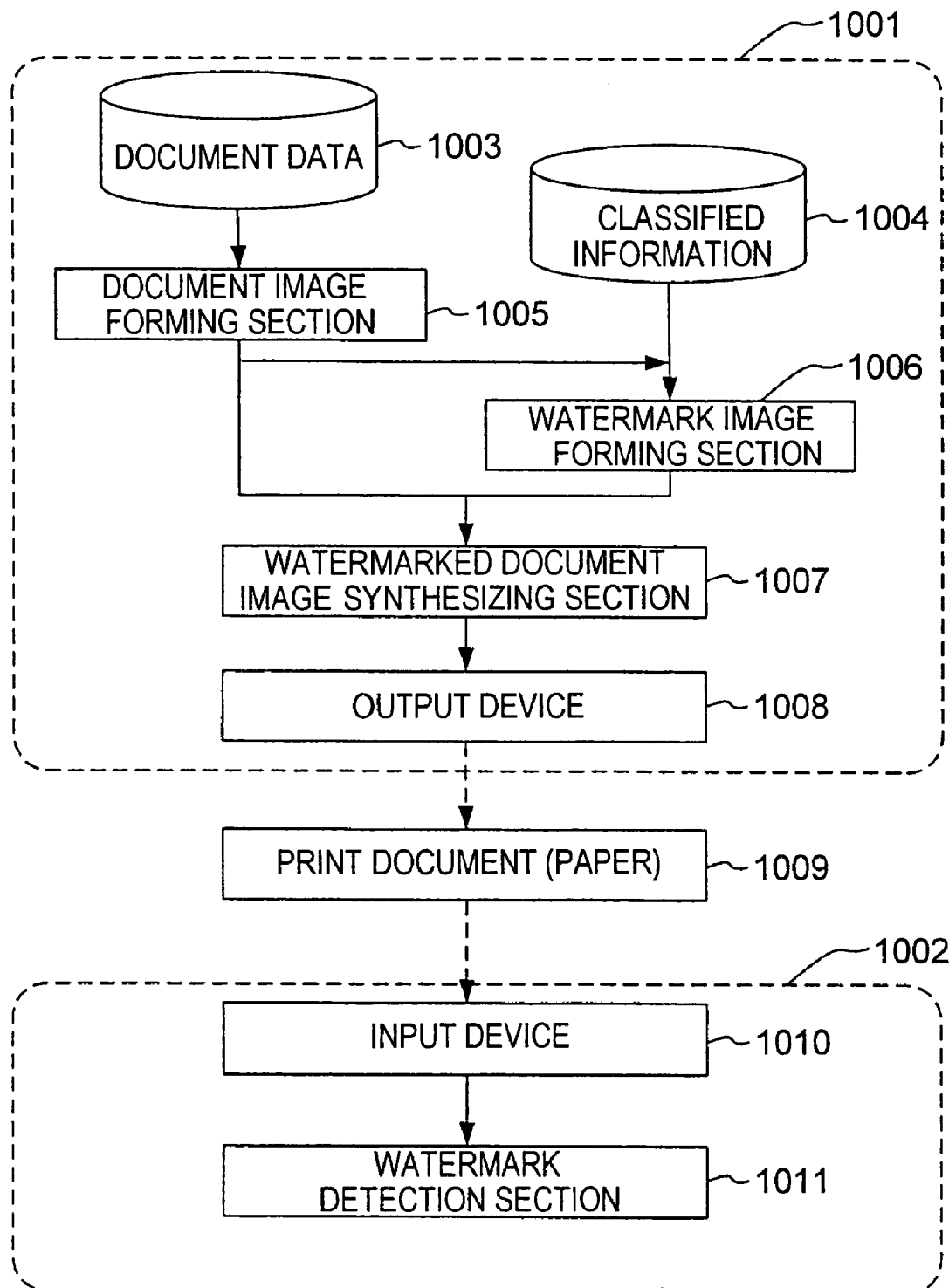
FIG. 1 is an explanatory diagram showing the structure of the electronic watermark embedding device and the electronic watermark detection device.

FIG. 1 is an explanatory diagram showing the structure of the electronic watermark embedding device and the electronic watermark detection device of the first embodiment of this invention. First, the electronic watermark detection device 1001 will be described.

(Electronic Watermark Embedding Device 1001)

The electronic watermark embedding device 1001 forms document images based on document data 1003 and classified information 1004 which is embedded in the document, and prints it on a paper medium. The document data 1003 is data including font information and layout information, and is data created by document creation tools and the like such as word processing software and the like. Also, the classified information 1004 is information which is embedded in the forms other than text and may be various types of data such as text, image, and sound.

As shown in FIG. 1, the electronic watermark embedding device 1001 comprises the document image forming section 1005, the watermark image forming section 1006, the watermarked document image synthesizing section 1007, and the output device 1008.

(Document Image Forming Section 1005)

In the document image forming section 1005, the image is created such that it is printed on the paper surface of the document data 1003. More specifically, the white pixel region is a portion of the document image where there is no printing, and the black pixel region is a portion that has been coated with black coating material. It is to be noted this embodiment is described on the premise that printing is done using black ink (black color) on white paper surface, but this invention is not limited to this type of printing, and may be similarly applied in the case of color (multicolor) printing.

(Watermark Image Forming Section 1006)

The watermark image forming section 1006 does N-elemental code of classified information 1004 which has been digitalized and converted to numerical values, and assigns watermark signal having each symbol of each codeword provided in advance. (N is a natural number which is 2 or more and the bit string that has been coded is called "codeword".) In this embodiment, the watermark embedding operation done by the watermark image forming section 1006 has special features. That is to say, when the watermark image forming section 1006 embeds classified information 1004 in the document data 1003, because the document data 1003 is used as a reference, embedding of the classified information 1004 can be ensured, regardless of what form the document data 1003 has. The watermark signal and the embedding operation are described in the following.

(Watermarked Document Image Synthesizing Section 1007 and Output Device 1008)

The watermarked document image synthesizing section 1007 creates a watermarked document image by superposing the document image and the watermark image. Also the output device 1008 is an output device such as a printer and the like, and it prints the watermarked document on a paper medium. Thus, the document image forming section 1005, the watermark image forming section 1006, and the watermarked document image synthesizing section 1007 may all be realized as one function in the printer driver.

The print document 1009 is a printout of the original document data 1003 having the classified information 1004 embedded therein, and it is physically stored and managed.

The electronic watermark embedding device 1001 has the structure described above.

Next, the watermark signal used when the watermark image forming section 1006 embeds classified information 1004 in the document data 1003 is described.

(Signal Unit)

Figure 2:
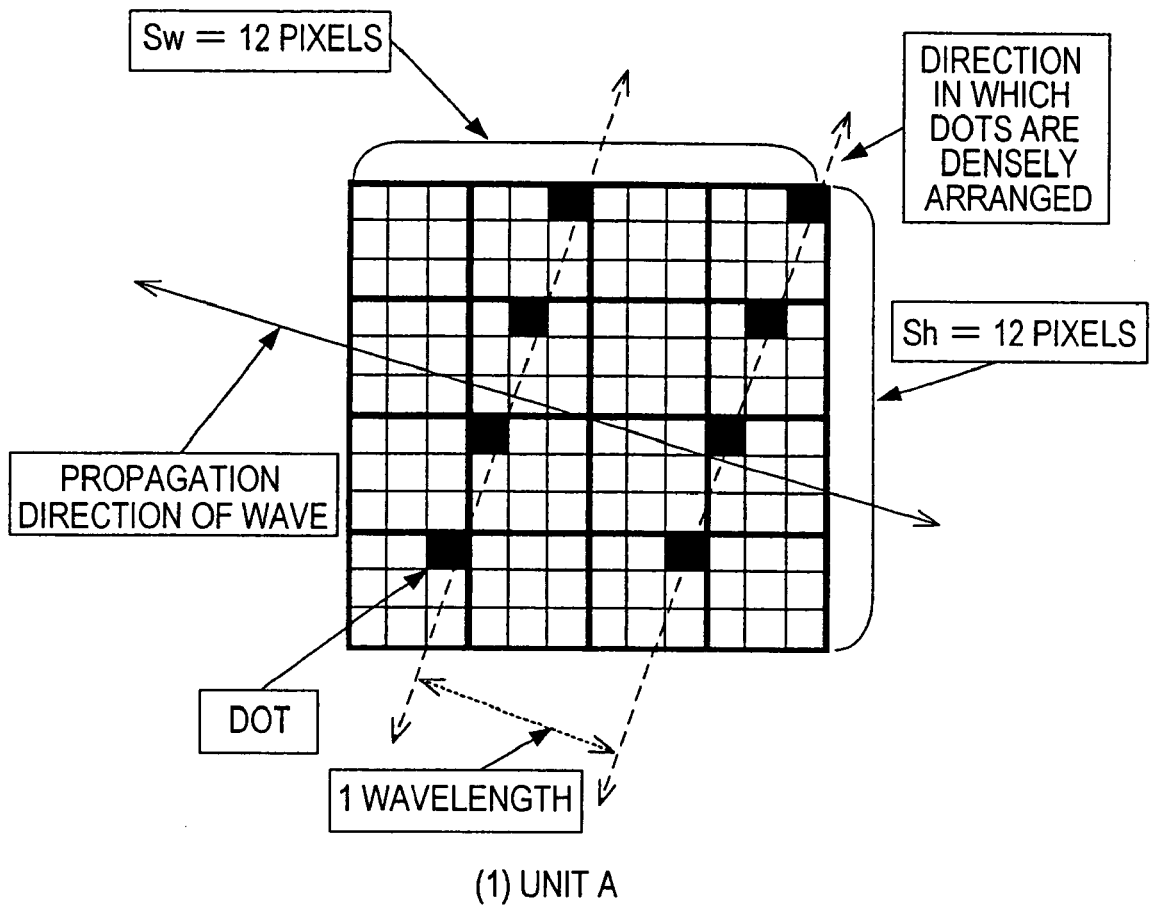
FIG. 2 is an explanatory diagram showing an example of a signal unit, and (1) shows unit A, and (2) shows unit B.
Figure 2:
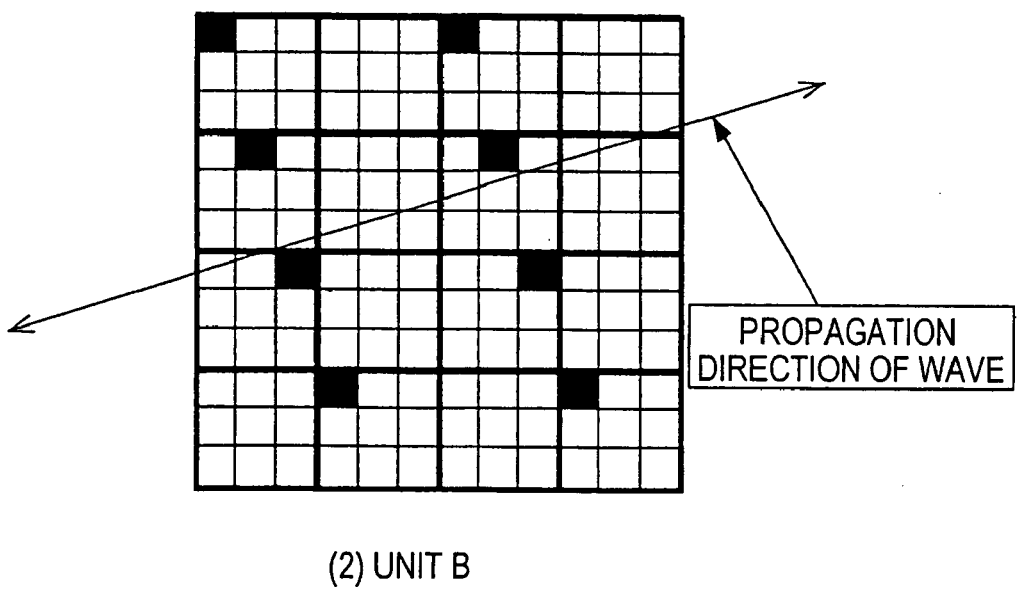

The watermark signal is an alignment of dots (black pixels) expressed as a wave having a arbitrary selected wavelength and direction. The rectangle having a width and height of Sw and Sh is a unit for one signal and is called "Signal unit" hereinafter. FIG. 2 is an explanatory diagram showing an example of the signal unit.

The width Sw and the height Sh may be different, but in this embodiment Sw will be equal to Sh for ease of explanation. The length unit is number of pixels, and in the example of FIG. 2, Sw=Sh=12. The size of these signals when they are printed on paper depends on the resolution of the watermark image. For example, if the watermark image is 600 dpi (dot per inch is the unit for resolution and is the amount of dots in 1 inch), the width and height of the signal unit of FIG. 2 on the print document is 12/600=0.02 inch.

In FIG. 2 (1) the distance between the dots is such that the dots are densely arranged in the arctan (3) (arctan is the inverse function of tan) direction with respect to the horizontal direction and propagation direction of wave is arctan (−1/3). This signal unit is called unit A hereinafter. In FIG. 2 (2) the distance between the dots is such that the dots are densely arranged in the arctan (−3) direction with respect to the horizontal direction and propagation direction of wave is arctan (1/3). This signal unit is called unit B hereinafter.

Figure 3:
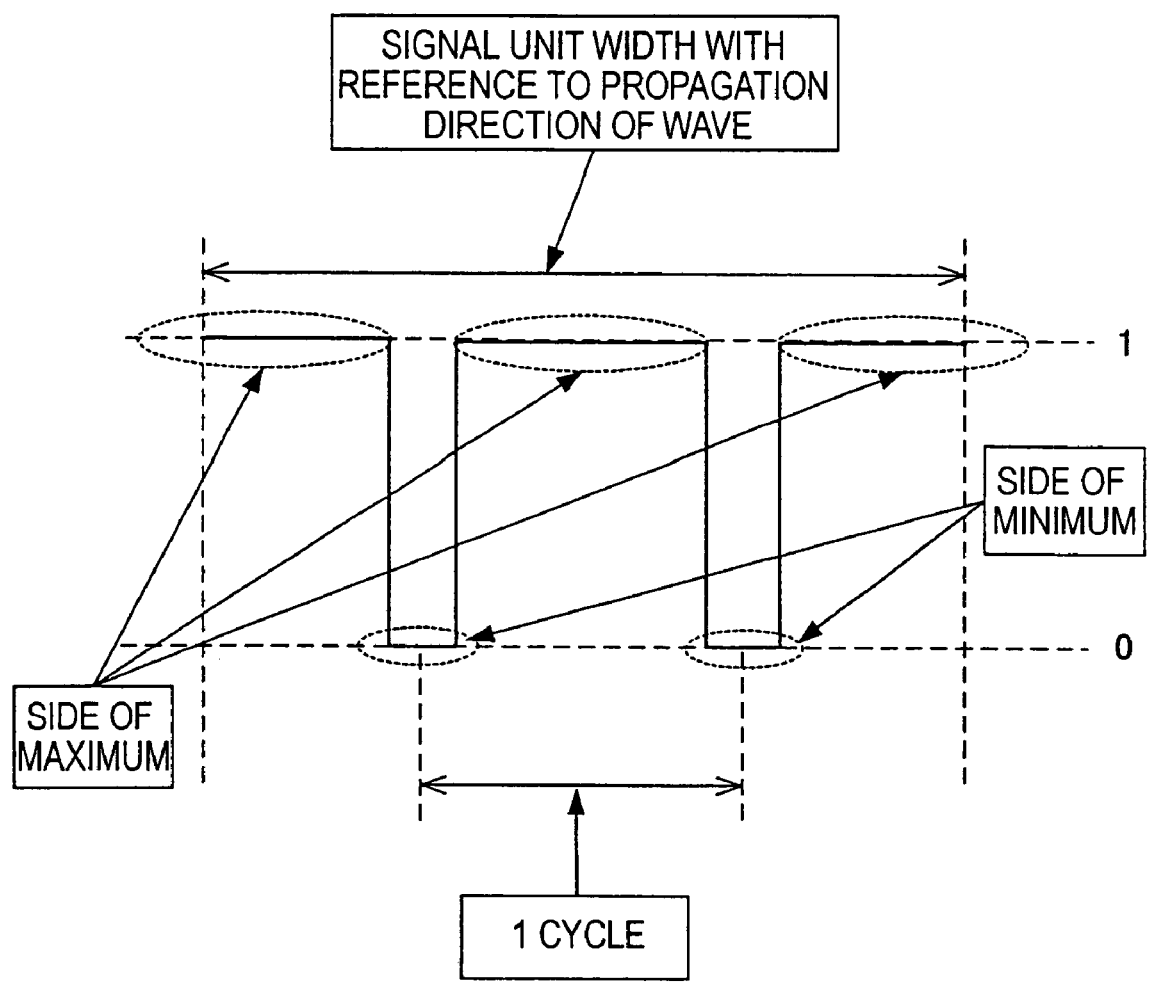
FIG. 3 is a cross sectional view of the change in the pixel value of FIG. 2(1) when viewed from the arctan (1/3) direction.

FIG. 3 is a cross-sectional view of the change in the pixel value of FIG. 2 (1) when viewed from arctan (1/3) direction. In FIG. 3, the portion where the dots have been aligned is the loop of the minimum value (the point where the amplitude will be a maximum), and the portion where the dots are not aligned is the loop of the maximum value.

In addition, the regions where the dots are densely arranged have two dots in each of the units, and thus in this example, the number of frequencies is 2. Because propagation direction of wave is vertical to the direction in which the dots are densely aligned, the wave in unit A is arctan (−1/3) with respect to the horizontal direction, and the wave in unit B is arctan (1/3). It is to be noted that when the arctan (a) direction and the arctan (b) direction are vertical, a xb=−1.

Figure 4:
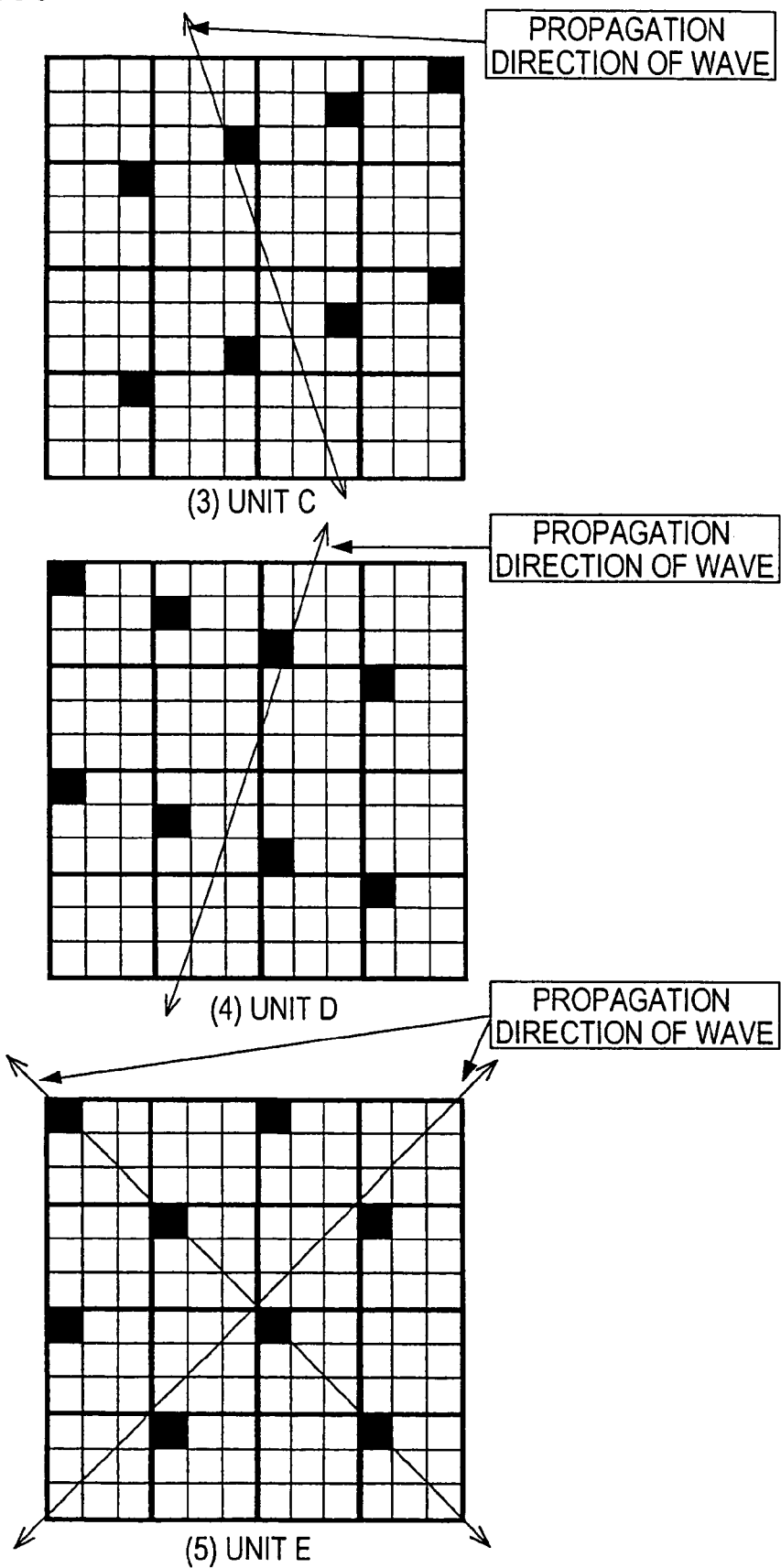
FIG. 4 is an explanatory diagram showing an example of a signal unit, and (3) shows unit C, (4) shows unit D, and (5) shows unit E.

Aside from the signal unit shown in FIG. 2(1) and (2), other dot alignments such as those shown in FIG. 4 (3)-(5) may be considered. In FIG. 4 (3), the distance between the dots is such that the dots are densely arranged in the arctan (1/3) direction with respect to the horizontal axis, and propagation direction of wave is arctan (−3). Hereinafter, this signal unit will be called unit C.

In FIG. 4 (4), the distance between the dots is such that the dots are densely arranged in the arctan (−1/3) direction with respect to the horizontal axis, and propagation direction of wave is arctan (3). Hereinafter, this signal unit will be called unit D. In FIG. 4 (5), the distance between the dots is such that the dots are densely arranged in the arctan (1) direction with respect to the horizontal axis, and propagation direction of wave is arctan (−1). It is to be noted that FIG. 4 (5) may be considered as having the distance between the dots densely arranged in the arctan (−1) direction with respect to the horizontal axis, and having a propagation direction of wave of arctan (1). Hereinafter, this signal unit will be called unit E.

(Symbol Unit)

Symbols for the codeword are assigned to the signal unit, and a signal unit is embedded in the watermark image, and the classified information 1004 is thereby embedded in the watermark image. The signal unit to which symbols of the codeword have been assigned is called "symbol unit" hereinafter.

The number of symbol units necessary is set by the dimension number when the classified information 1004 is converted into the codeword. When the classified information is subjected to binary code (N=2), 2 types of symbol units are used (for example, unit A and Unit B) and symbol 0 is, for example, assigned to unit A, and symbol 1 is assigned to unit B. In addition, when the classified information is subjected to 4-elemental code (N=4), 4 types of symbol units are used (for example, unit A, unit B, unit C and unit D) and for example, symbol 0 is assigned to unit A, symbol 1 is assigned to unit B, symbol 2 is assigned to unit C, and symbol 3 is assigned to unit D.

(Background Unit)

Further, a symbol which is unrelated to the symbol of the codeword (when the classified information is subjected to N-elemental code, for example) may be assigned to unit E, and this may be defined as the background unit. These maybe lined up with no space between them to form the background of the watermark image. Hereinafter, signal unit that has been assigned the symbol which is unrelated to the symbol of the codeword will be referred to as the "background unit". In the case where the background units are lined up without space in between them, when a symbol unit is to embedded therein, the background unit which is at the position where the symbol unit is to be embedded is replaced with the symbol unit that is embedded.

Figure 5:
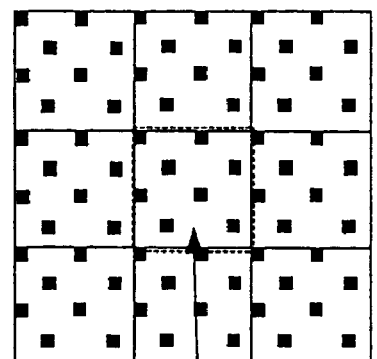
FIG. 5 is an explanatory diagram of the background image, (1) defines unit E as the background unit, and this shows the case where the watermark images are aligned without spaces between themselves as the background, (2) shows an example in which unit A is embedded in the background image of (1), and (3) shows an example where unit B is embedded in the background image of (1).
Figure 5:
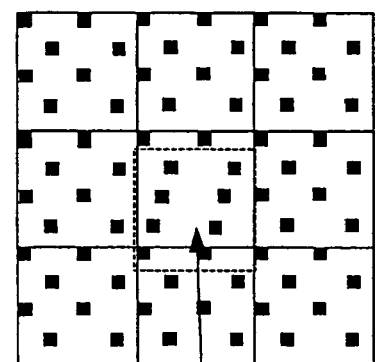
Figure 5:
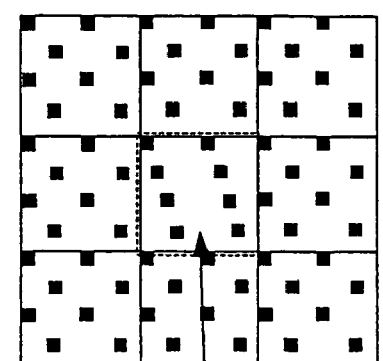

FIG. 5 (1) is an explanatory diagram in which unit E is defined as the background unit, and the case in which units E are lined up with no space between them and used as the background of the watermark image is shown. FIG. 5 (2) shows an example in which unit A is embedded as the symbol unit in the background image of FIG. 5 (1) FIG. 5 (3) shows an example in which unit B is embedded as the symbol unit in the background image of FIG. 5 (1).

In the example shown in FIG. 5, since the number of dots in each of the signal units is equal, because the signal units are lined up without space between them, the shading of the watermark image appears uniform. Thus, on the surface of the printed paper, it appears as if a gray image with a single density has been inserted as the background. In addition the combinations of symbol assignment for the signal unit can be considered as infinite. In this manner it becomes difficult for a third party (one attempting illegal activity) to decode the watermark signal.

(Unit Pattern)

It is also possible to embed classified information 1004 in the watermark signal by simply disposing the corresponding symbol unit for each symbol of the codeword which was used to code the classified information 1004. In this embodiment, a method will be described in which in order to further prevent a third party from carrying out illegal decoding, the signal arrangement pattern (referred to hereinafter as unit pattern) for each symbol in the codeword is defined, and the classified information 1004 is embedded in the watermark image by disposing the unit patterns. The concept of the unit pattern will be explained with reference to FIG. 6.

FIG. 6 shows an example of the unit pattern used in this embodiment and the symbols represented by that unit pattern. In this case, the one unit pattern has signal unit matrix where width (row)×height (column)=4×2. Also the background unit is unit E (symbol 2) and the symbol units that are embedded in this background unit are units A (symbol 0) and unit B (symbol 1).

In FIG. 6 (1) a number of units A (symbol 0) greater than or equal to a prescribed threshold value (for example 6) are disposed, and the entire unit pattern shows the symbol 0.

In FIG. 6 (2) a number of units B (symbol 1) greater than or equal to a prescribed threshold value (for example 6) are disposed, and the entire unit pattern shows the symbol 1.

In FIG. 6 (3) an approximately equal number of units A and units B (an equal number of each, or the number of one of the symbol units is one more than the other) are disposed, and the entire unit pattern shows the symbol 2.

The configuration and watermark signal of the electronic watermark embedding device 1001 were described above. Next, the operation of the electronic watermark embedding device 1001 will be described with reference to FIGS. 7-13.

The document image forming section 1005 creates an image for each page based on document data 1003 when the document is printed on paper. This description assumes that the document image is a black and white binary image. In the following description, the "text region" of the document image is the region which is coated with ink (toner) when the document image is printed by a printer, and is the pixel (black pixel) that has a pixel value of 0 in the document image. Also, the "background region" is the region which is not coated with ink (toner) when the document image is printed by a printer, and the pixel (white pixel) has a document image pixel value of 1.

Figure 7:
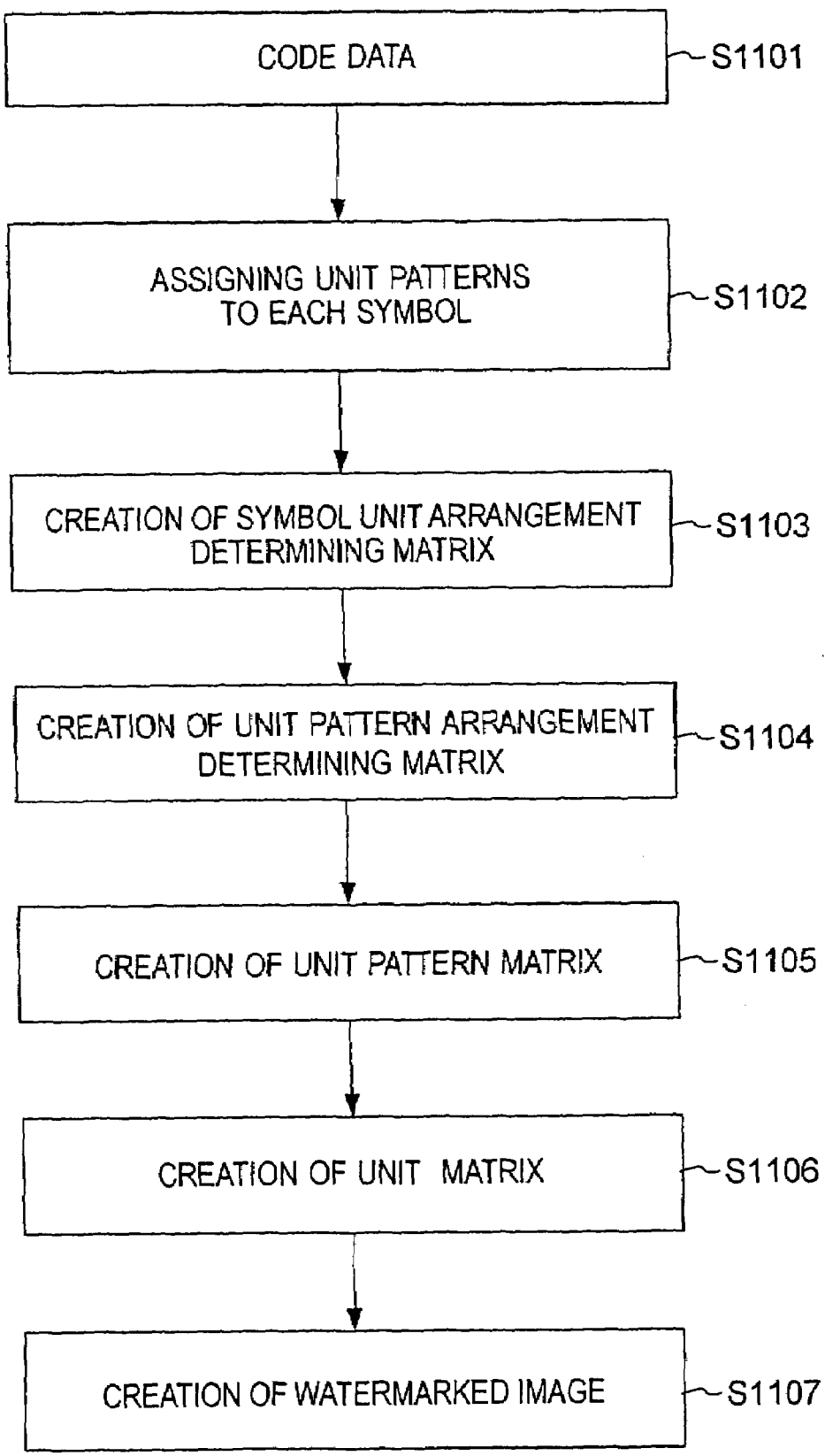
FIG. 7 is a flowchart showing the flow of the process of the watermark image forming section 1006.

The watermark image forming section 1006 creates a watermarked image which is superposed as background of the document image from the classified information 1004. The following is a description of the operation of the watermark image forming section 1006 with reference to FIG. 7. FIG. 7 is an explanatory diagram showing process flow of the watermark image forming section 1006.

(Step S1101)

In the step S1101, the classified information 1004 is converted to N-elemental code. N is a arbitrary selected value, but for the sake of simplicity N=2 in the following description (the classified information 1004 will be converted to binary code). Accordingly, the codeword which is created in step S1101, is expressed using the 0 and 1 bit example. In this step S1101, the classified information 1004 may be coded as it is, or it may be encoded and then coded.

(Step S1102)

As shown in FIG. 6, in Step 1102, unit patterns are assigned to each of the symbols of codeword.

(Step S1103)

In step S1103, the symbol unit arrangement determining matrix is defined. The symbol unit arrangement determining matrix shows a matrix in which the document image is divided into pixel blocks where the size of one block is Sw (width)×Sh (height), and it shows whether or not a symbol unit has been embedded in the block corresponding to the document image. Because the locations cannot be detected in the case where symbol unit is inserted in the text region, the matrix is for indicating the location where the symbol units can be embedded beforehand. If the pixel value of the matrix is 1, a symbol unit can be embedded in the block corresponding to the document image, if the value is 0, a background unit will be embedded. Here, Sw and Sh are the width and height respectively of the signal units, and if the size of the input document image is in the form W×H, the number of pixels for the unit matrix Um is:

Width (row)×height (column)=$Mw \times Mh = W/Sw \times H/Sh$

Each element of the symbol unit arrangement determining matrix is decided by whether or not a text region exists in the block corresponding to the document image. For example, the arbitrary selected element (X, Y) (Y column, x row) of the symbol unit arrangement determining matrix is 1 in the case where the text region (pixel with pixel value of 0) which is included in x=x×Sw to (X+1)×Sw, y=Y×Sh to (Y+1)×Sh of the input document image is less than the Tn pixels, and in the case where the document image is larger than the Tn pixels, it is 0. Tn is the threshold value, and is a number less than Sw×Sh×0.5.

Figure 8:
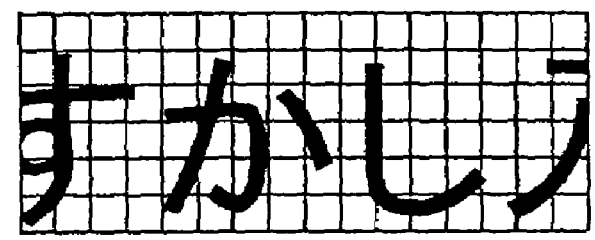
FIG. 8 is an explanatory diagram showing an example of the symbol unit arrangement determining matrix.
Figure 8:
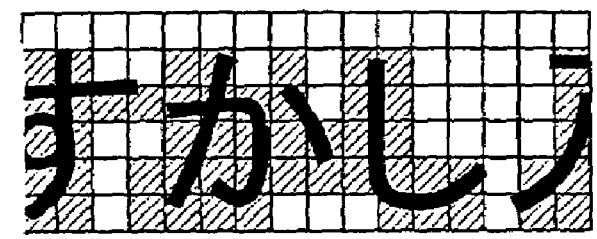
Figure 8:
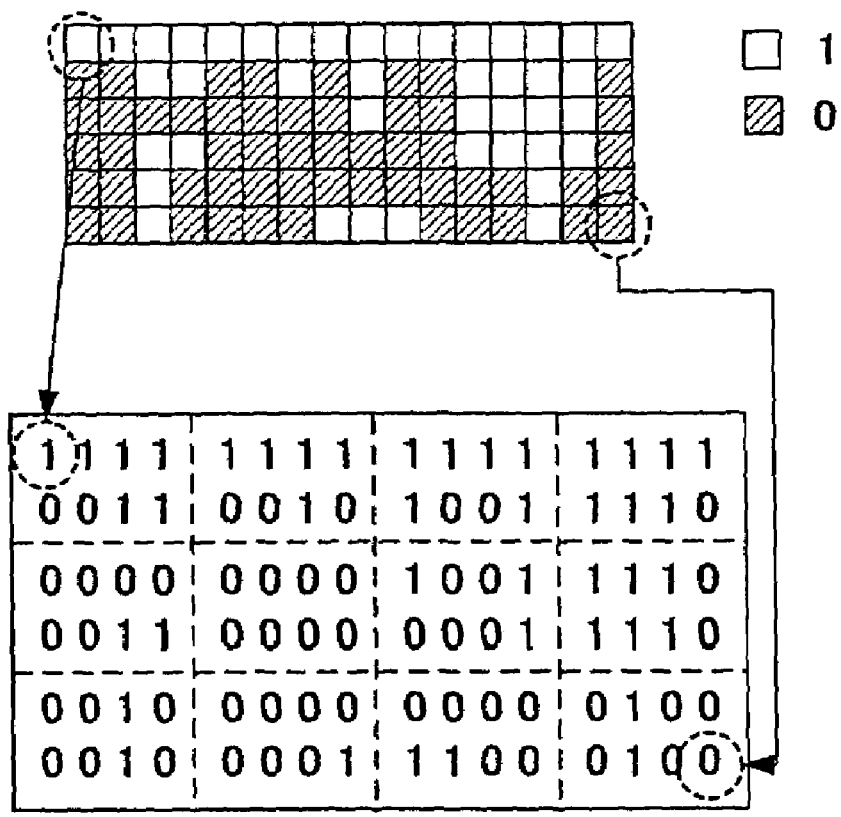

FIG. 8 shows an example of the creation of the symbol unit arrangement determining matrix. FIG. 8(1) shows the block corresponding to each element of the symbol unit arrangement determining matrix superposed on the input document image. FIG. 8(2) shows that when text region is included in each block, the value for the corresponding block is 0. In FIG. 8(3), the value of each element of the symbol unit arrangement determining matrix is decided from the text region determination results.

(Step S1104)

In step S1104, the symbol unit arrangement determining matrix is created. The value of the element is 1 in the case where the unit pattern can be inserted into the region in the document image corresponding to this matrix, and in the case where it cannot be inserted the value is 0. If the unit pattern is defined such that the matrix for the signal unit is width (rows)×height (columns)=4×2, then determination as to whether or not the unit pattern can be inserted is carried out in the following manner. Firstly, the symbol unit arrangement determining matrix shown in FIG. 8(3) is separated into 4×2 regions. Of the 8 signal units that make up 1 region, if a number of symbol units greater than or equal to a prescribed threshold value Tu (Tu is about 6) can be inserted (and the value of the symbol unit arrangement determining matrix is 1), then it is determined that unit pattern embedding is possible, and in cases other than this, it is determined that embedding is not possible.

Figure 9:
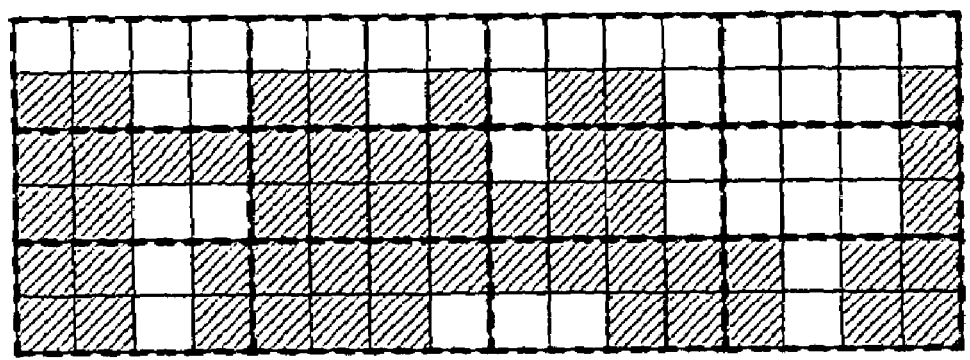
FIG. 9 is an explanatory diagram showing an example of the unit pattern arrangement determining matrix.
Figure 9:
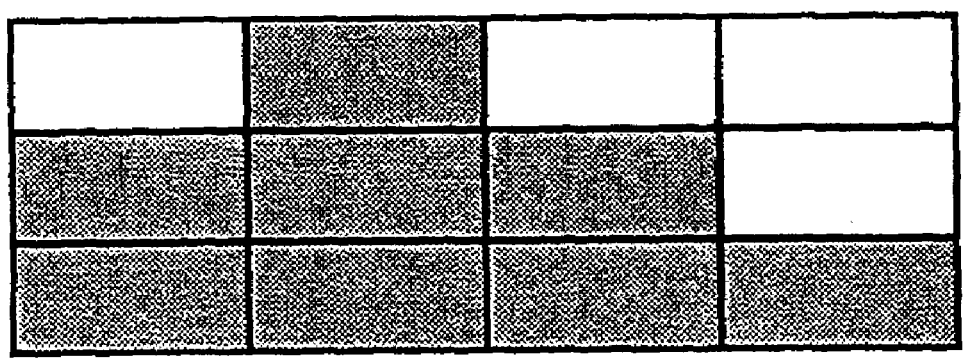
Figure 9:
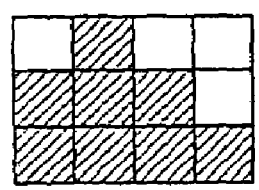
Figure 9:
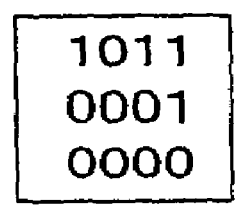

FIG. 9 is a drawing in which an example of the creation process for the unit pattern arrangement determining matrix is explained. FIG. 9(1) shows that 1 unit pattern comprises 8 signal units. FIG. 9(2) shows that for each unit pattern, when the number of the element of the corresponding symbol unit arrangement determining matrix having a value of 1 is greater than or equal to Tu (=6), that unit pattern is assigned a value of 1, and all the other unit patterns are assigned a value of 0. FIG. 9(3) shows that the value of each element of the unit pattern arrangement determining matrix is set.

(Step S1105)

Figure 10:
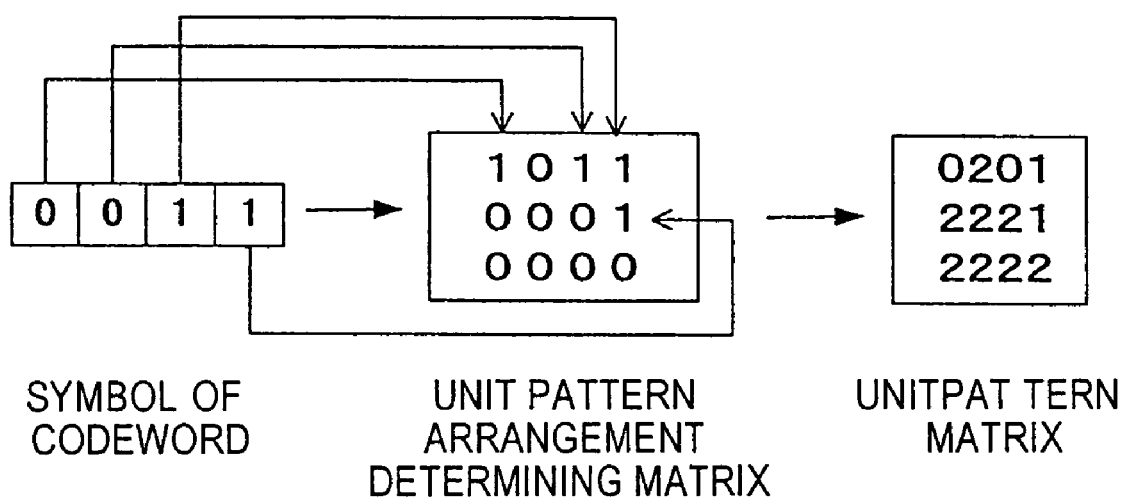
FIG. 10 is an explanatory diagram showing an example of the unit pattern matrix.

In step S1105, the unit pattern matrix is created using the unit pattern arrangement determining matrix as a reference. The symbol of the codeword is repeatedly set in the unit pattern matrix, but it is not set in the elements into which the unit pattern cannot be embedded. For example, as shown in FIG. 10, the size of the unit pattern matrix and the unit pattern arrangement determining matrix is Pw×Ph=4×4, and the symbol of the codeword is the 4 bits of (0011). Because in this chart, the element in the second row of the first column is 0, the second bit of the codeword (symbol 0) is not set, symbol 2 is set and the second bit of codeword in the third row of the first column is set.

(Step S1106)

In step S1106, the unit matrix Um is created based on the unit pattern matrix and the unit pattern arrangement determining matrix. The unit matrix Um has the same size as the symbol unit arrangement determining matrix, and is matrix that describes the arrangement pattern of the signal unit. The rules for signal unit arrangement are as described in the following.

Step 1: In the symbol unit arrangement determining matrix, at the position where the element is 0, a background unit (symbol 2) is set. (FIG. 11(1)).

Step 2: In the case where the element of the unit pattern matrix is the symbol of the codeword, the symbol unit corresponding to that symbol is set in the corresponding region of the unit matrix Um. (FIG. 11(2))

Step 3: When the unit pattern matrix is different from the symbol of the codeword (the value of unit pattern arrangement determining matrix is 0) the symbol units indicating 0 and the symbol units indicating 1 that have the same numbers only are set. (FIG. 11(3))

Step 4: In the regions in which the signal units are not set, background unit are set. (FIG. 11(4))

To summarize, if the background symbol is set in the text region, and the background regions in the arbitrary selected unit pattern is greater than or equal to Tu (=6), a symbol of the codeword is assigned, and cases other than that, exactly the same number of the 2 type symbol units are assigned in the background region. In the case where there are an odd number of background regions, a background symbol is set in the one remaining region. As a result, because the unit pattern to which a symbol of the codeword has been assigned has more than 6 of the same unit patterns set, at the time of detection, the total of the output value of the filter corresponding to the symbol unit which has been embedded, is much larger than the total output value of the other filter. The difference in the total output value of the 2 filters for the unit pattern to which a symbol of the codeword has not been assigned is small. Accordingly, the determination as to whether or not the unit pattern is one to which the codeword has been assigned can be easily made.

(Recording of Embedding Conditions)

The size of the signal unit in the input image of the electronic watermark detection device 1002 is calculated from the size of the signal unit set at the electronic watermark embedding device 1001, and the ratio of the resolution of the output device and the resolution of the input device.

For Example, if:

The size of the signal unit embedded in the document at the electronic watermark embedding device 1001, is width×height=Sw×Sh (pixels).

The size of the signal unit embedded in the input image at the electronic watermark detection device 1002, is =Siw×Sih.

The resolution of the output device 1008 is Dout (dpi) and the resolution of the input device 1010 is Din (dpi), then:

$$Siw = Sw \times Din/Dout$$

$$Sih = Sh \times Din/Dout$$

However, it is to be noted that because of differences in the resolution of the printer or scanner (the values of Din and Dout are different from the set values), Siw and Sih may not necessarily have the values given by the above formulas. This causes a shift in the signal detection position of the input image in the electronic watermark detection device 1002, and the detection accuracy of the embedded classified information 1004 is thus low.

For example if Sw=Sh=12, Dout=600 and Din=400, Siw=Sih=12×400/600=8, but there may be errors in the values of Din and Dout and in that case Siw and Sih will not be 8. Even if the error in Siw is 0.1% (an error of 0.008 pixel, and it is actually a little larger than this), if A4 paper is scanned with a scanner resolution of 400 dpi, the size of the input image will be approximately width×height=3000×4000 (pixels), and using the left end of the image as a reference, the position shift in the image at the right side is 3000×0.008=24 (pixels), and thus it is shifted by 3 signal units and this has a large effect on detection accuracy.

As a measure for solving this problem, the number of signal units to be embedded in the watermark image is arbitrary selected to be a sufficiently large multiple of the integer Ns. Thus, this is a method of utilizing error absorption when the size of the signal unit is calculated backwards from the size of the signal embedding region of the input image. The following is a description of another method.

Figure 12:
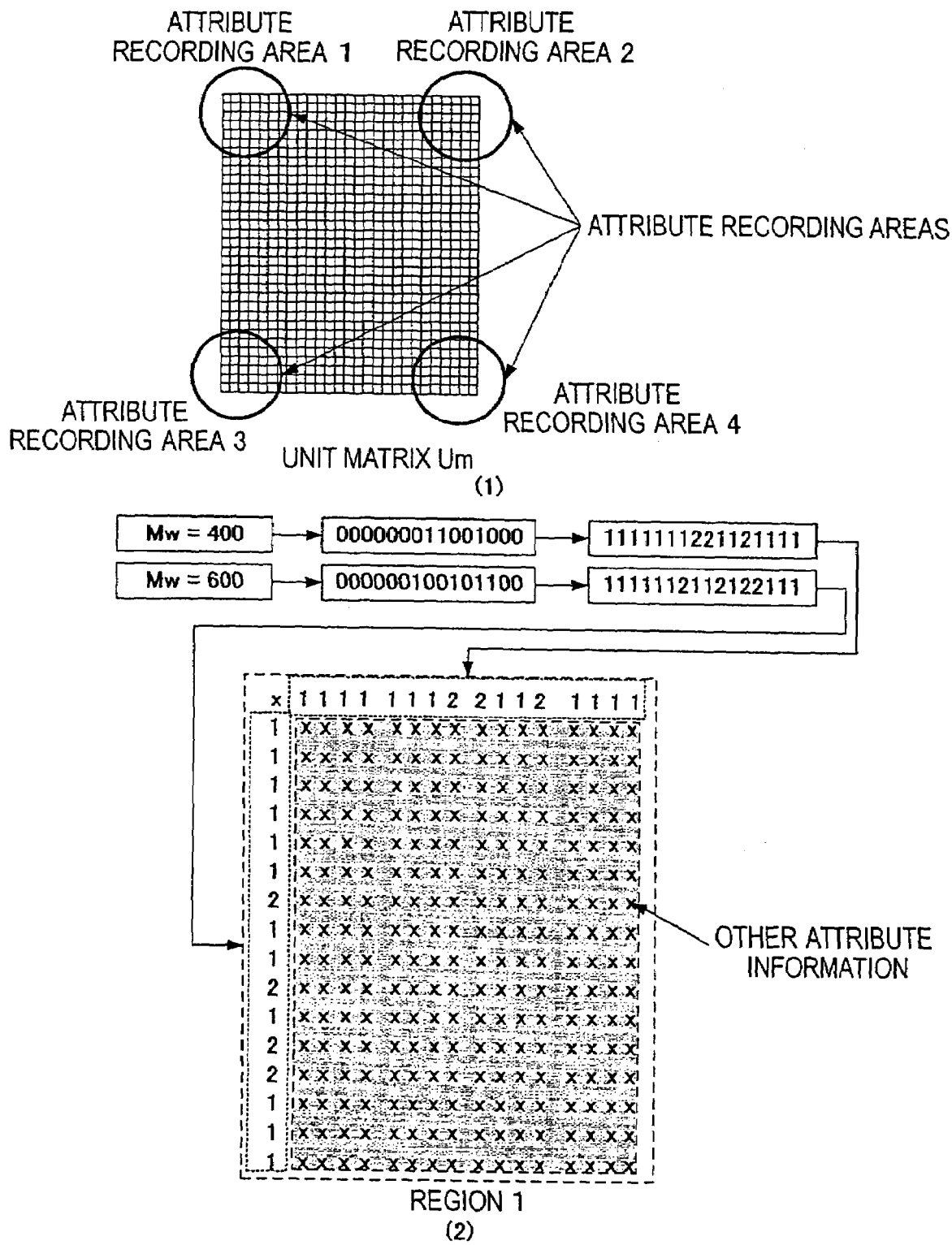
FIG. 12 is an explanatory diagram of attribute recording region.

As shown in FIG. 12, this embodiment explains a method in which and a recording region (referred to hereinafter as attributes recording region) for other embedding conditions such as the number of signal units (size of the unit matrix Um) embedded in the watermark image embedded in the 4 corners of the unit matrix Um and the resolution of the printer are used. That is to say, as shown in FIG. 12 (1), when the size of the unit matrix Um (x, y) and x=1 to Mw, y=1 to Mh, the vicinity of Um (1,1) Um (Mw, 1), Um (1,Mh), Um (Mw, Mh) is used as the attribute recording region.

FIG. 12(2) is an explanatory diagram of an example in which the size of the unit matrix is set in the attribute information recording section of the unit matrix. This shows a method in which Mw and Mh respectively are expressed by 16 bits and recorded in the attribute recording region 1. For example, if Mw=400 is expressed by 16 bits of 2 adic numbers, then it would be "0000000110010000". According to the unit matrix expression rules (step S1105), this is converted to the value "1111111221121111". This is recorded in the unit matrix (2, 1) to Um (17, 1). Similarly, if Mh=600 is expressed by 2 adic numbers and converted by the unit matrix expression rules, it will be recorded in the unit matrix (1, 2) to Um (1, 17).

The region Um (2, 2) to Um (17, 17) may record the other attributes such as the printer resolution, and Mh can be repeatedly recorded so that detection of the size of the unit matrix at the electronic watermark detection device 1002 is ensured. In addition, Um (1, 1) to Um (17, 17) was used as the attribute recording region 1, but to what range Um (1, 1) to Um (x, y) is extended changes depending on estimation of error in the information amount and Dout and Din which are recorded as attributes. Further, the size of the attribute recording region may be known, or the range of the attribute recording region may be recorded in the attribute recording region itself and the classified information 1004 may not be embedded in this region, or the region may be ignored at the time of detection. Only the attribute recording region 1 was explained in FIG. 12(2), but the explanation for the attribute recording region 2-attribute recording region 4 is the same. The effects of setting attribute information regions at the 4 corners of the unit image will be explained below in the section explaining the electronic watermark detection device 1002.

(Step S1107)

Figure 13:
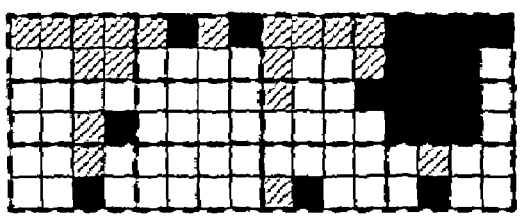
FIG. 13 is an explanatory diagram showing an example of step S1107.
Figure 13:

FIG. 13 is an example of the step S1107. At step S1107 the signal unit is disposed in the background image in accordance with the unit matrix Um (FIG. 13 (1)) created at the step S1106 (FIG. 13 (2)). The background image that was created by comparison with the signal unit is superposed, and a watermarked document image is created (FIG. 13 (3)). The electronic watermark embedding device 1001 was described above. Next, the electronic watermark detection device 1002 will be described with reference to FIG. 1, and FIGS. 14-19.

(Electronic Watermark Detection Device 1002)

The electronic watermark detection device 1002 is a device which takes in the document 1009 which has been printed on a paper medium as an image, and decodes the embedded classified information 1004. As shown in FIG. 1, the electronic watermark detection device 1002 comprises the input device 1010 and the watermark detection section 1011.

The input device 1010 is an input device such as a scanner, and the document 1009 which was printed on paper, is taken into a computer as gray image. In addition, at the watermark detection section 1011, filter processing is carried out for the input image, and the embedded signal is detected. The symbol is returned from the detected signal to the original form, and the embedded information 1004 is extracted.

The operation of the electronic watermark detection device 1002 having the structure described above will be described with reference to FIGS. 14-19.

(Watermark Detection Section 1011 and Step S1201)

Figure 14:
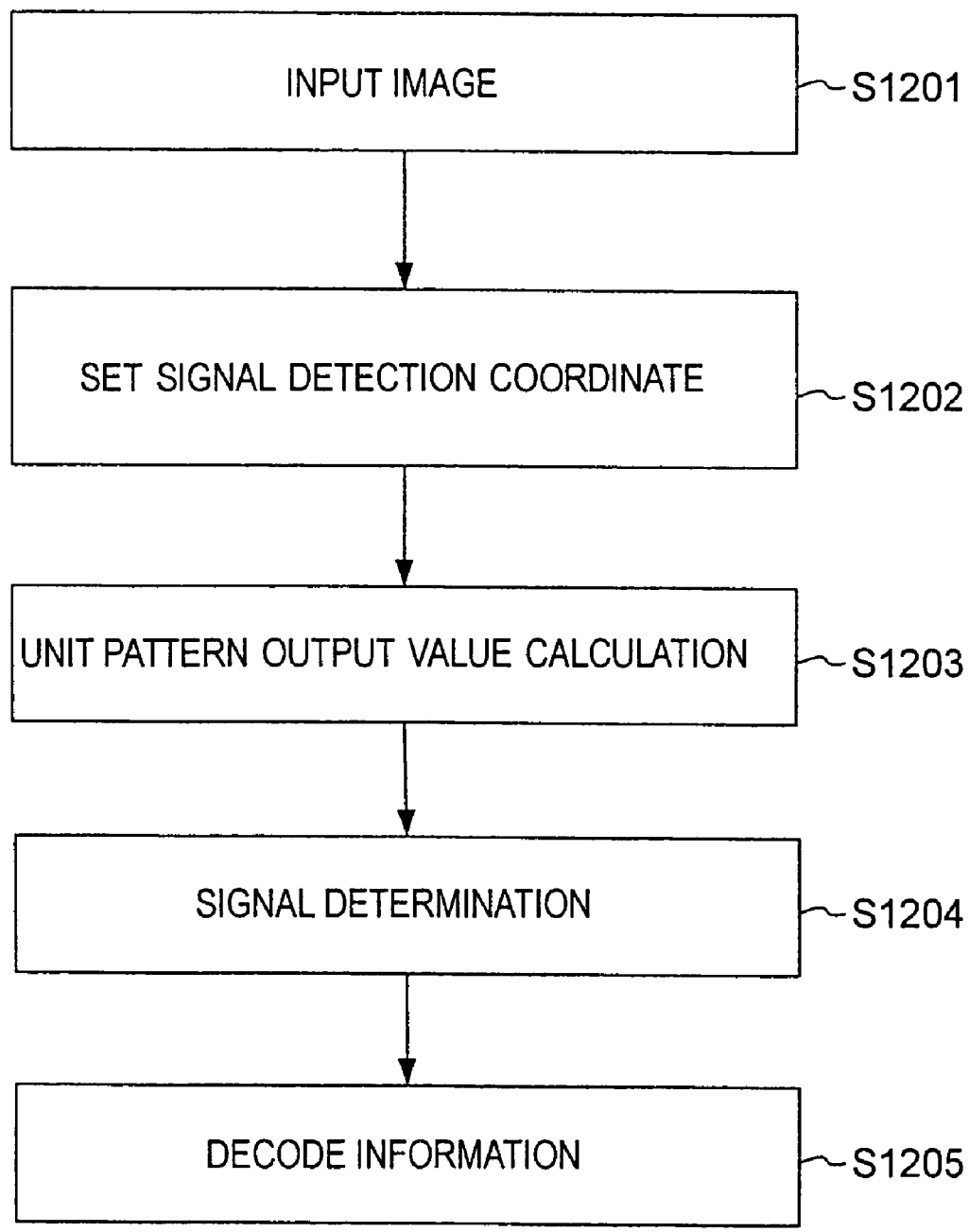
FIG. 14 is an explanatory diagram showing the process flow of the watermark detection section 1011.

FIG. 14 shows the flow of the process in the watermark detection section 1011.

At step S1201, the image of the watermarked printed document is input from the input device 1010.

(Step S1202)

At step S1202, the outline of the region into which the signal unit has been embedded (referred to as signal unit hereinafter) is detected from the input image, and corrections such as image rotation are done.

Figure 15:
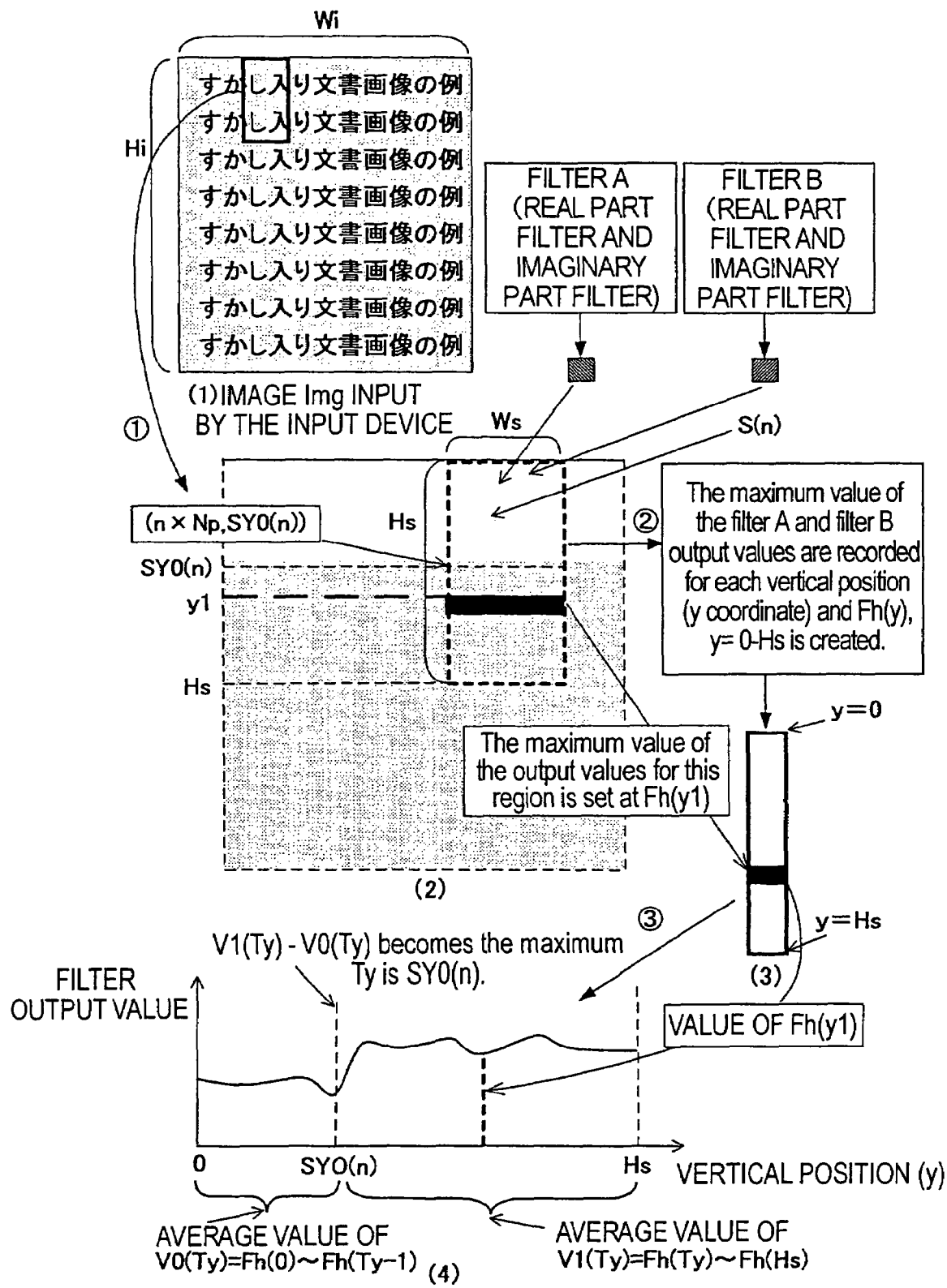
FIG. 15 is an explanatory diagram of the method for detecting the signal region.

FIG. 15 is an explanatory diagram of a method for detecting the signal region.

FIG. 15 (1) is the input image at step S1201. This shows an example in which the upper end of the signal region is detected. For the input image, 1 mg (x, y) x=0 to Wi−1, y=0 to Hi−1. In addition, the size of the signal unit embedded in the document at the electronic watermark embedding device 1001 has width×height=Sw×Sh (pixels), the resolution of the output device 1008 is Dout (dpi), and the resolution of the input device 1010 is Din (dpi), and $$TSw = Sw \times Din/Dout$$

$$TSh = Sh \times Din/Dout$$

That is to say, tSw and tSh are theoretically the size of the signal unit in 1 mg, and the signal detection filter is designed based on this value.

A sample region S (x), x=1 to Sn for detecting the upper end of the signal region in the image 1 mg is set. Sn is Wi/Np (Np is an integer of about 10 to 20). Also, the width of S (x), Ws=Sw×Nt (Nt is an integer of about 2 to 5), the height is Hs=Hi/Nh (Nh is about 8) and the position in the horizontal direction of the S(x) 1 mg is x×Np.

A detection method for the upper end SYO (n) of the signal region in arbitrary selected S(n) is shown below.

Step 1: A region corresponding to S(n) is cut from 1 mg. (FIG. 15 (2))

Step 2: Filter A and Filter B corresponding to S(n) are provided and the maximum value in the horizontal direction in S(n) is recorded in Fs (y) (FIG. 15 (2)

Step 3: One threshold value Ty is set, the average value of Fs (1) to Fs (Ty-1) is V0 (Ty) and the average value of Fs (Ty) to Fs (Hs) is V1(Ty). The Ty value which cause V1(Ty) to V0(Ty) to be maximum is set at SYO (n) as the position of the upper end of the signal region in S(n).

FIG. 15 (4) shows the changes in the value for Fs (y). As shown in the figure, the average output value for the signal detection filter in a region that does not have an image signal unit is small. Meanwhile, because the symbol unit (unit A or unit B) is densely disposed in the background portion by the document image detection section 1001, the output value of the signal detection filter is large. (The blank portion of the document is the background, and the symbol unit is densely disposed here as well.) Accordingly, at the signal region which separate the boundary areas from the other regions, the output value changes greatly, and this is used in region detection.

Step 1 to Step 3 are carried out for S(x), x=1 to Sn and SYO (x), x=1 to Sn is obtained. Sample points SO (x×Np, SYO (x)), x=1 to Sn obtained from the upper end of the signal region obtain uses the law of minimum squares to an approximate straight line. The other border lines are also detected using the same method described above, and for example an image whose signal region that has been rotated such that the upper end of the signal region becomes horizontal, is called the input image in the description below.

Figure 16:
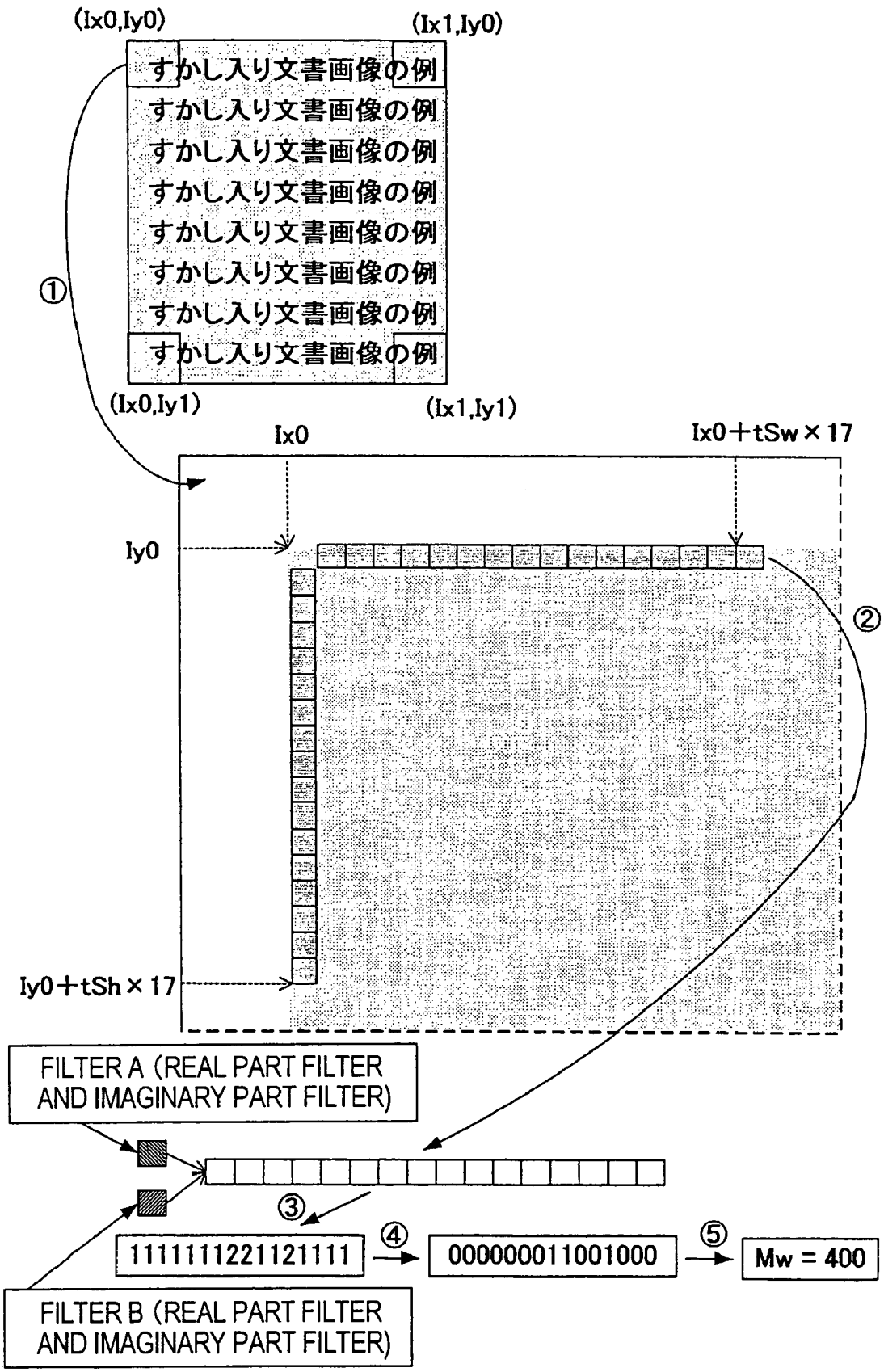
FIG. 16 is an explanatory diagram showing an example of a method for restoring the size of unit matrix which was embedded in the attribute region.

FIG. 16 shows an example of a method for returning the unit matrix embedded in the attribute region to its original size. In this example, the signal region of the input image is (I x 0, I y 0) to (I x 1, I y 1), and the information of the attribute recording region 1 is returned to it original form.

Step 1: The region in the input image (I x 0, I y 0) vicinity is cut out (FIG. 16 (1)).

Step 2: An attribute recording region 1 is set for the cut-out region. (FIG. 16 (2)). The attribute recording region 1 is made the same as that set at the document image detection section 1001, and detected for example, as the most significant bit when Mw is expressed as 16 bits, ((I x 0+t Sw, I y 0), and the least significant bit ((I x 0+t Sw×17, I y 0).

Step 3: Filter A and Filter B are provided for the embedding region for Mw which was set at Step 2, and the symbol unit corresponding to the larger of the output values for filter A and filter B at each bit position, is determined as being embedded at that bit position (FIG. 16 (3)).

Step 4: The value of Mw is returned to the original form in the order opposite to that with which it was set at the document image detection section 1001(FIG. 16(4) (5)).

The theoretical values tSw and tSh of the size of the signal unit in the input image include error. Thus, since the boundary lines detected in FIG. 15 are each used as a reference when detecting the signal position in the attribute recording region, in the case for example, where tSw=tSh=12, Dout=600 and Din=400, tSw=tSh=12×400/600=8, the size of the attribute recording region is only about 8×17=136 pixels. Supposing that the error is about 1% (it is actually smaller), there is an error of one pixel from the reference point of the attribute region to the position that is furthest away, and this has the effect that a substantially accurate signal detection position can be set.

The true width Siw of the signal unit in the input image is calculated based on the width Mw of the unit matrix that was taken out from the attribute recording region, and the width (I x 1−I x 0) of the signal region which was obtained from FIG. 15 by $$Siw = Mw/(Ix1 - Ix0).$$

Similarly, the true width of the signal unit SiH is calculated by $$Sih = Mh/(Iy1 - Iy0).$$

(Step S1203 and 1204)

Figure 17:
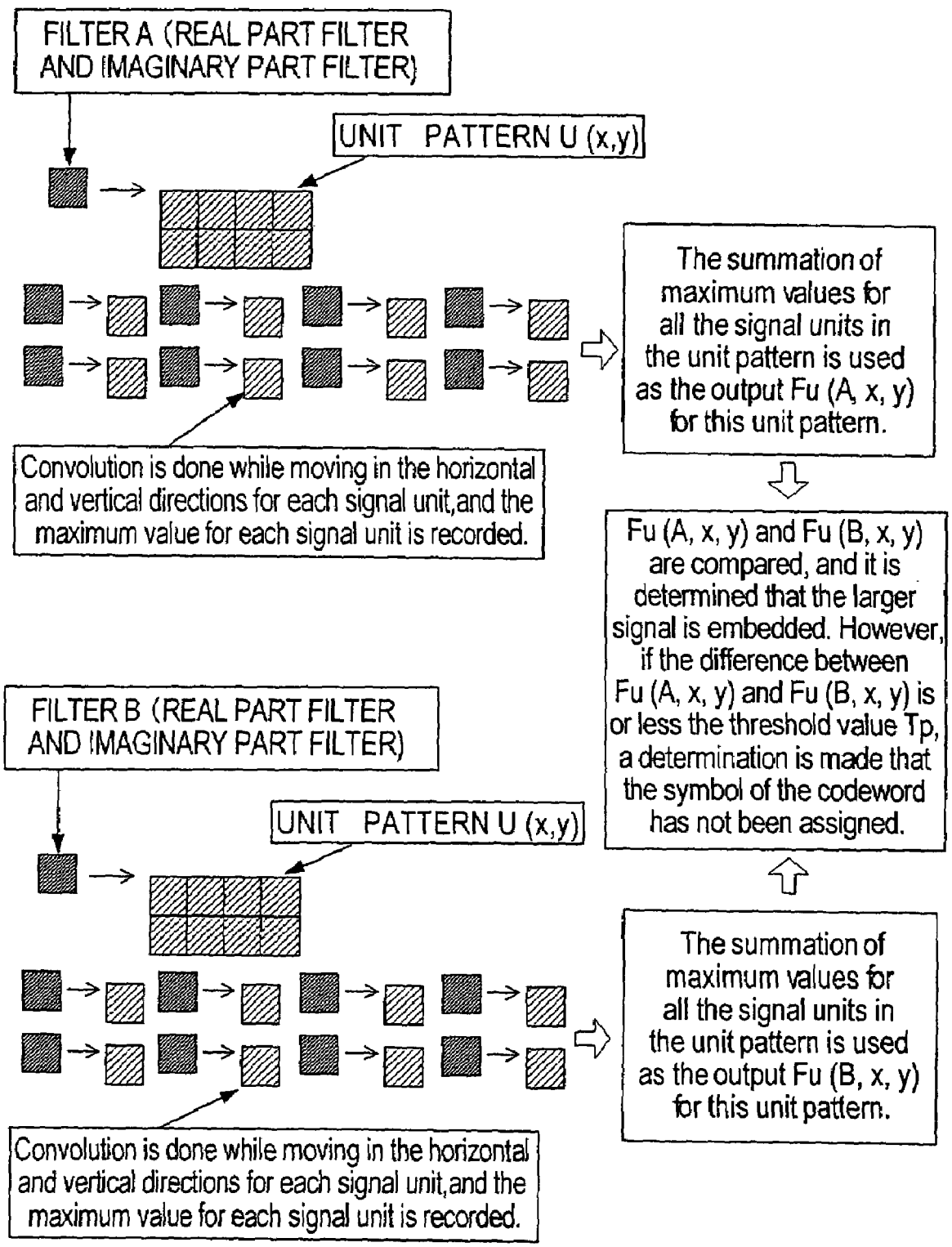
FIG. 17 is an explanatory diagram of step S1203 and step S1204.

FIG. 17 is an explanatory diagram showing step S1203. Step S1203 calculates the total filter output value for all the unit patterns. In FIG. 17, the convolution (convolution integral) with filter A for each of the signal units that form the unit pattern U(x, y) is calculated, and the summation of the convolution output value for each of the signal units is defined as the filter A output value Fu (A, x, y) for the unit patterns. However, the convolution for each unit signal is the maximum value of the results of calculations while shifting the position of filter A in the horizontal and vertical directions for each signal unit.

The output value Fu (B, x, y) for the unit pattern U (x, y) is calculated in the same manner for filter B.

In step S1204, Fu (A, x, y) and Fu (B, x, y) are compared, and if the absolute value of the difference between these two |Fu (A, x, y)−Fu (B, x, y)| is smaller than the preset threshold value Tp, then it means a codeword symbol has been assigned. For other cases, it is determined that the codeword symbol for the larger of Fu (A, x, y) and Fu (B, x, y) has been assigned. That is to say, if Fu (A, x, y)>Fu (B, x, y), the symbol 0 is embedded in (x, y), and Fu (A, x, y)<Fu (B, x, y), then the symbol 1 is embedded in U (x, y).

Figure 18:
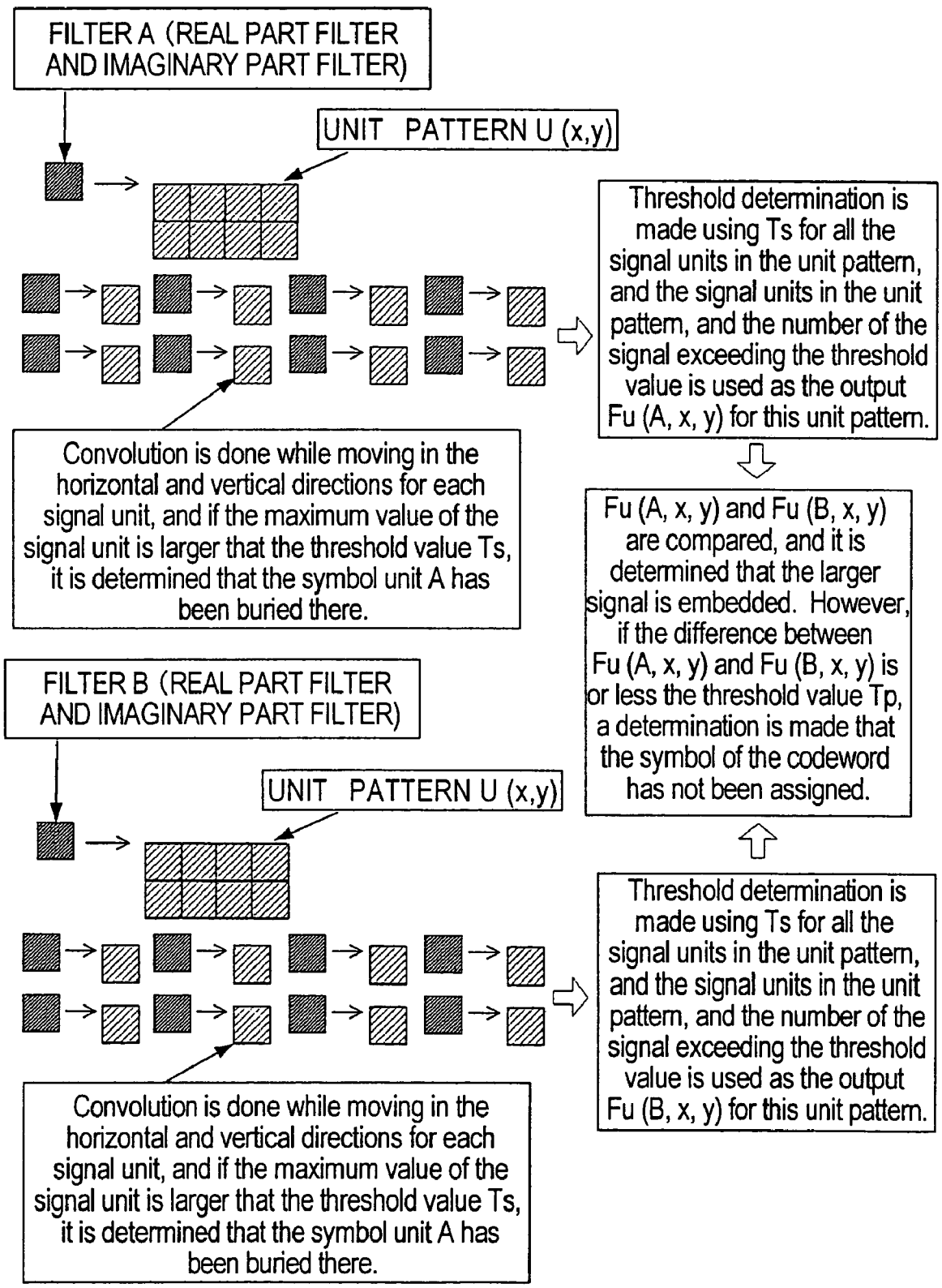
FIG. 18 is an explanatory diagram of a separate method for realizing step S1203 and step S1204.

FIG. 18 is an explanatory diagram of another method which realizes step S1203 and step S1204. In FIG. 18, the convolution with filter A for each of the signal units that form the unit pattern U (x, y) is calculated. At this time, threshold value Ts for symbol unit detection is set, and if the convolution for the filter A corresponding to each unit signal is greater than or equal to Ts, it is determined that the signal is symbol A. The number of signals in the unit pattern U (x, y) determined to be symbol A is defined as the filter A output value Fu (A, x, y) for the unit pattern U (x, y). However, the convolution for each signal unit is the maximum value of the results of calculations while shifting the position of filter A in the horizontal and vertical directions for each signal unit.

The output value Fu (B, x, y) for the unit pattern U (x, y) is calculated in the same manner for filter B.

The process for step S1204 is the same as that of FIG. 17 except that Fu (A, x, y) and Fu (B, x, y) are signal numbers that are detected inside the unit pattern.

All of the unit patterns obtained from the input images are simultaneously processed in FIG. 17 or FIG. 18, or in both FIG. 17 and FIG. 18, and the unit pattern matrix U is created.

(Step S1205)

Figure 19:
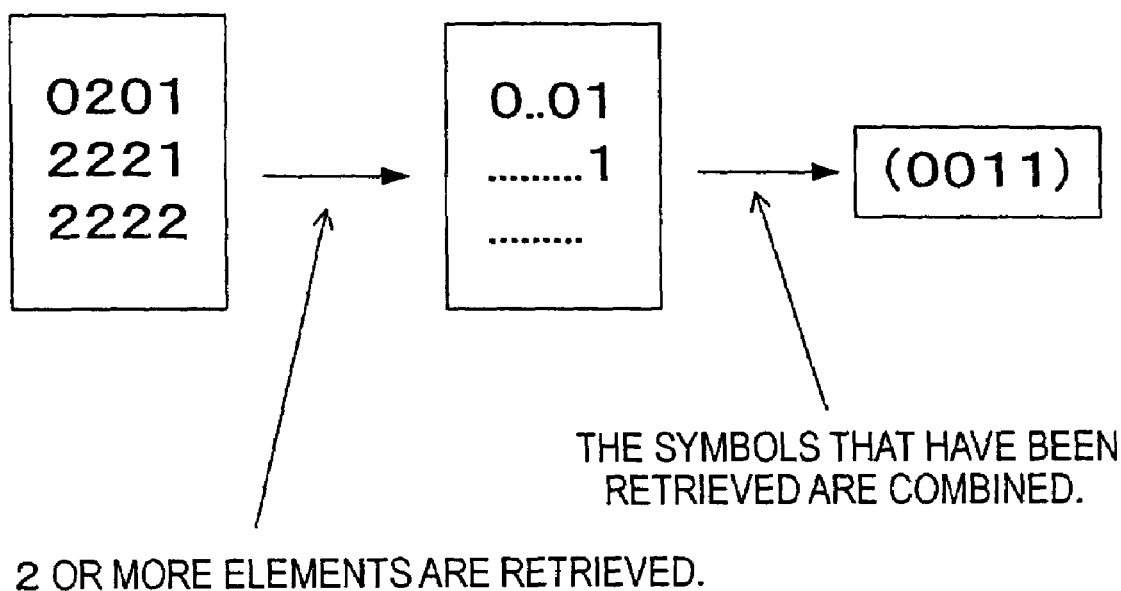
FIG. 19 is an explanatory diagram showing an example of a method for taking the codeword out from the unit pattern matrix.

In step S1205, the information which was embedded based on the determined symbol is decoded. FIG. 19 shows an example of the method for extracting the codeword from the unit pattern matrix. In FIG. 19, the elements that have not been assigned a symbol considered to be set as symbol 2, and the elements that are set as symbol 2 are ignored, and the symbols are extracted and decoded.

As described above, the following effects are achieved by this embodiment of the invention.

(a) By embedding a meaningful signal (codeword signal) only in regions that do not overlap with text referring to the arrangement of text in the document image to be watermarked, embedding of classified information can be ensured regardless of the form of the original document.

(b) The same number of inverse symbol units are put in the regions with no codeword symbol embedded, and thus at the time of detection, it can be determined with certainty that there are no symbols embedded.

(c) When the embedding information is being detected, symbol determination is done by the total output value for 2 filters corresponding to a particular region, and thus the information detection accuracy is kept high.

(d) By setting attribute recording regions in which attribute information such as the embedded signal number are set in the four corners of the region where the signal is embedded, hardware errors at the output device have no effect at the time when the classified information is being detected, and the attribute information can be extracted correctly, and the accuracy of the subsequent detection is improved.

Second Embodiment

Figure 20:
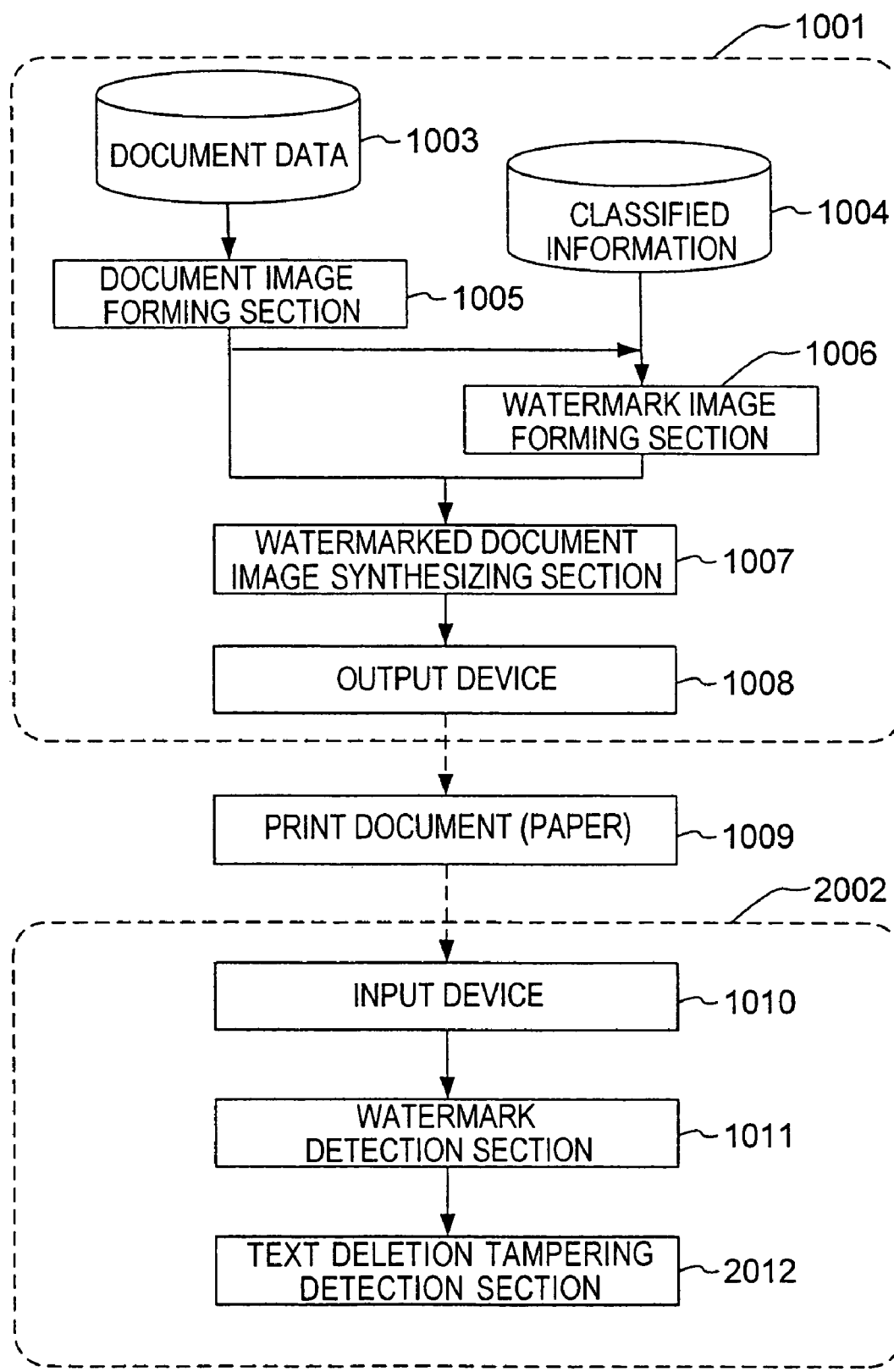
FIG. 20 is shows the structure of a second embodiment of this invention.

FIG. 20 is an explanatory diagram showing the structure of the electronic watermark embedding device and the electronic watermark detection device of the second embodiment of this invention. The difference between this and the first embodiment is that, the electronic watermark detection device 2002 also has a text deletion alteration detection section 2012. Here the structure and operation of the electronic watermark embedding device 1001 is the same as that of the first embodiment.

(Text Deletion Alteration Detection Section 2012)

The text deletion alteration detection section 2012 is the portion where the process is carried out for detecting the presence and location of alteration in the case where text portion of the print document 1009 has been altered with by deletion with correction fluid and the like.

Figure 21:
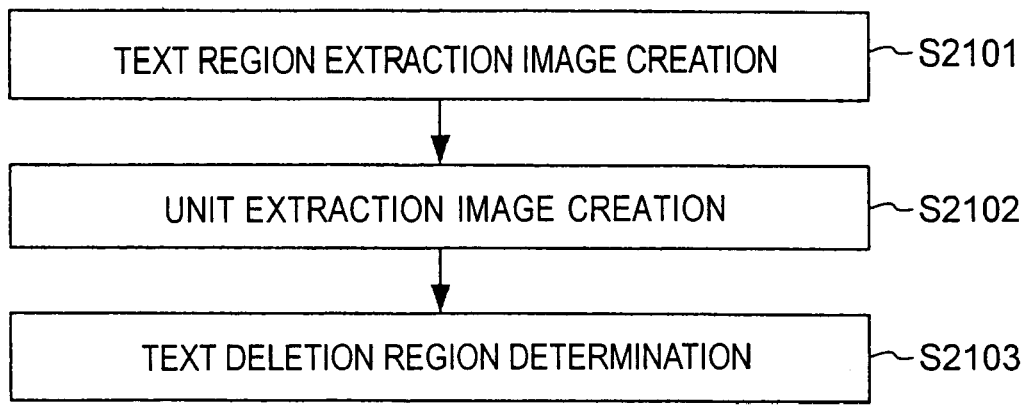
FIG. 21 is a flowchart showing the operation of the text deletion alteration detection section.

FIG. 21 is a flowchart showing the operation of the text deletion alteration detection section.

It is assumed that the alteration is the case where text portion of the print document 1009 has been deleted with correction fluid and the like. The basic principle alter of detection is as described in the following. In the print document 1009 created by the electronic watermark embedding device 1001 is characterized by the following:

(1) In the text region, background unit are embedded, but symbol units are not.

(2) Symbol units are embedded densely in the background region (region other than the text region).

For this reason, even if the background region is altered with due to deletion of the text region (of the print document), it is difficult for a new symbol unit to be embedded in that portion, and thus the appearance of "regions in which symbol units are embedded despite the fact that these are background regions (regions of alteration)" can be used at the time of signal detection.

The image which has been corrected by rotation and the like of the input image at the input device 1010 is referred to as the input image as in the first embodiment.

In addition, the description is based on the following assumptions:

The size of the signal unit embedded in the document at the electronic watermark embedding device 1001 is width× height=Sw×Sh (pixels).

The number of embedded signal units=width× height=nw×nh.

There are two types of symbol units, unit A and unit B.

The size of the signal unit in the input image is Siw×Sih.

Here, in the case where the resolution of the output device and that of the input device are the same, Siw=Sw and Sih=Sh, but when the resolutions are different, Siw and Sih are calculated by their ratios. For example, if the resolution of the output device is 600 dpi and the resolution of the input device is 400 dpi, Siw=Sw×2/3 is Sih=Sh×2/3 (Step S2101)

At step S2101, the text image is detected by binarizing the input image. In the image that is input by the input device, the pixel of the text region is small (an almost black color), and the pixel of the background region is high (an almost white color). Watermark signals are embedded throughout the entire surface of print document, but because the number of dots is much less per unit area of the watermark signals than the that of the text region, the background region containing the watermark signal and the text region are distinguished by the binary processing. The threshold for binarizing can be preset or may be set dynamically using an image processing such as Discriminant Analysis method from pixel value distribution of the input image.

Figure 22:
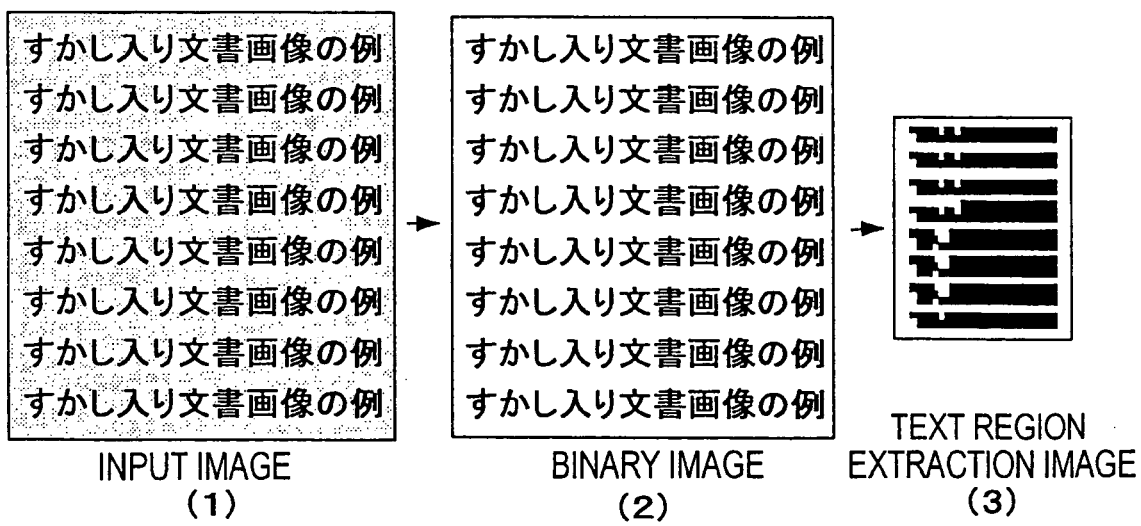
FIG. 22 is an explanatory diagram of the text region extraction image.

FIG. 22 is an explanatory diagram of the text region extraction image.

In the binary image, the pixel value corresponding to the text region is set at 0, and the pixel value corresponding to the background region is set at 1. The image obtained from binarizing which is also reduced to an image size of nw×nh is called the text region extraction image (FIG. 22). When the pixel is to be reduced, the value for one pixel is determined from the Siw×Sih pixel block of the binary image prior to reduction. However, if the Siw×Sih pixels having a value of 0 in the binary image is greater than or equal to the prescribed threshold Tn, the pixel value of the corresponding text region extraction image is 0. The threshold value Tn is about Siw×Sih×0.5.

At the step S2102, the unit matrix Um corresponding to the input image is created, the symbol unit is detected, and the unit extraction symbol is created.

(Step 2102)

Figure 23:
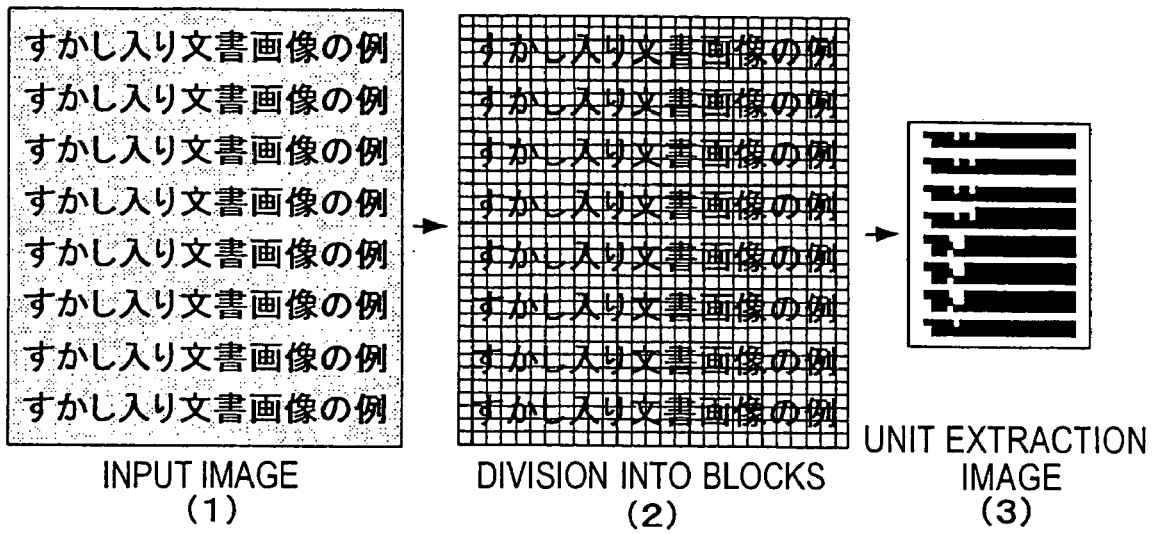
FIG. 23 is an explanatory diagram of step S1022.

FIG. 23 is an explanatory diagram of step 2102. First, the input image is divided into nw×nh blocks (the size of one block is Siw×Sih) (FIG. 23 (2)), and symbol units are detected by signal detection filters for each divided block.

The determination as to whether or not a symbol unit has been detected is carried out as described in FIG. 18 where, in the case in which the output value of one of filter A and filter B exceeds the threshold value Ts, a determination is made that a symbol unit has been embedded in that block. It must be noted that here it is not necessary to make a distinction in terms of which signal was embedded. The result of the symbol unit being detected for all the blocks is displayed on a chart and called the unit extraction image (FIG. 23 (3)). The size of the unit extraction image is the same as that of the number of divided blocks and is Sw×Sh. In the unit extraction image in FIG. 23, the size of the image for the white pixel (pixel value is 1) in the number of pixels in which a symbol unit has been detected, and for the black pixel (pixel value is 0), it is the number in which no symbol unit has been detected.

(Step S2103)

Step 3 compares the text region extraction image created in step 2102 with the unit extraction image created in step 2101, and detects alteration. Because no symbol units are originally embedded in the portion that overlaps with the text region of the input image, that is, because symbol units are embedded only in the background region, the symbol unit in the detection region in the unit extraction image (pixel value is 1) and the background region in the text region extraction image (pixel value is 1) will match. Thus, if a difference image between the text region extraction image and the unit extraction image is generated, the region whose value is not 0 is detected as "a portion that has been subjected to alteration by text deletion from the print document (paper).

Figure 24:
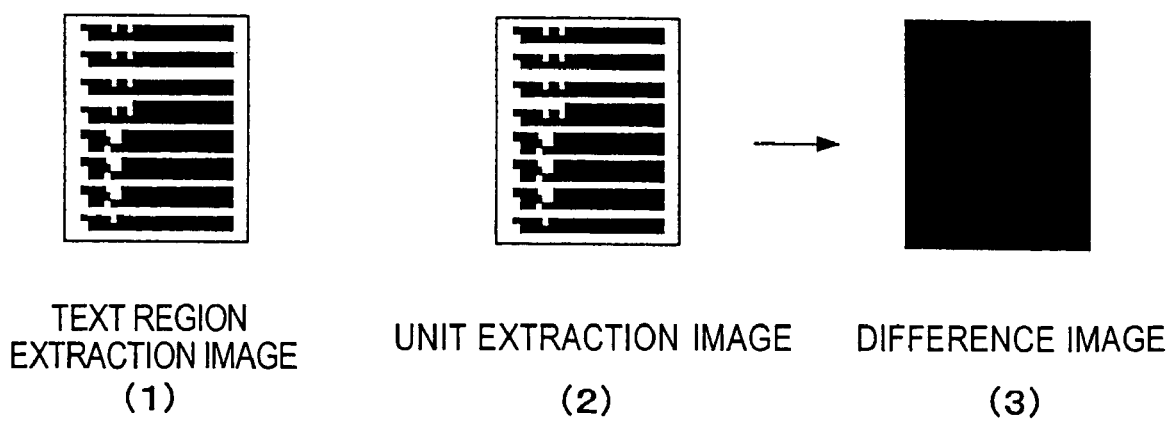
FIG. 24 is an explanatory diagram of Step S2103

FIG. 24 is an explanatory diagram of step 2103. In this case because there is no alteration, the pixel value of all the difference images is 0.

Figure 25:
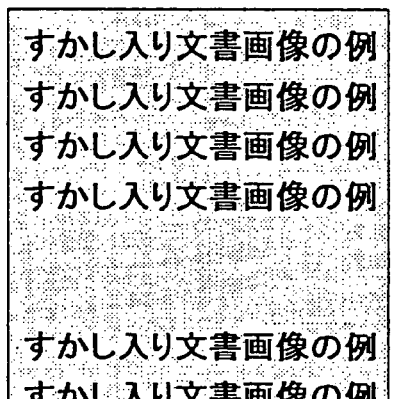
FIG. 25 is an explanatory diagram of the case where there has been alteration.
Figure 25:
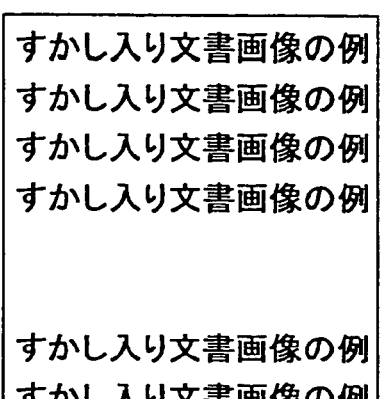
Figure 25:
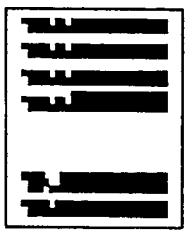
Figure 25:
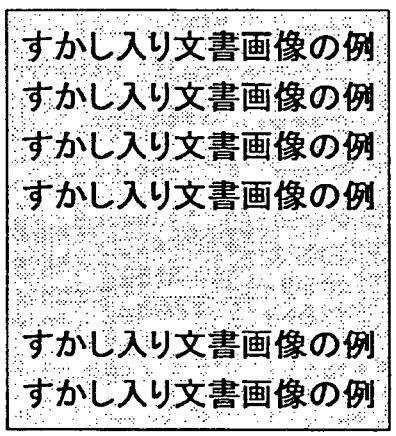
Figure 25:
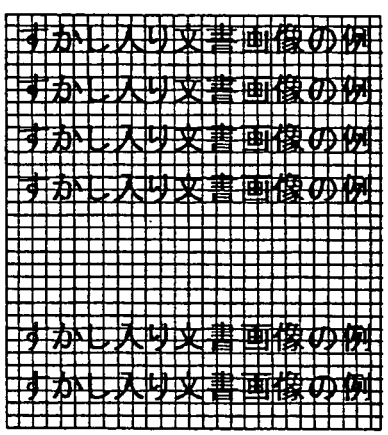
Figure 25:
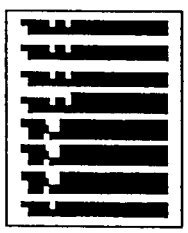
Figure 25:
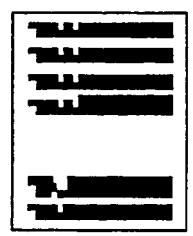
Figure 25:
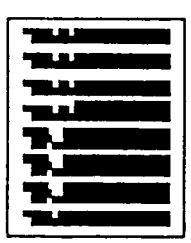
Figure 25:

FIG. 25 is an explanatory diagram showing the case in which alteration has occurred. Text region of the input image is deleted, and because text region is not extracted from the region of the text region extraction image corresponding to this deleted region, the pixel value is 1 (FIG. 25(3)). However, because a unit symbol is not detected in the same region, the pixel value of the region corresponding to the unit extraction image is 0 (FIG. 25 (6)). Thus when the difference image is calculated, regions whose value pixel are not 0 appear, and these can be identified as the location where alteration occurred (FIG. 25 (9)).

It is to be noted that the size of the signal unit is extremely small, and by embedding a symbol unit in the space in one text character, even when the text is deleted with correction fluid and the like and replaced with different text, because the symbol unit which is in the text has been erased, it cannot be detected. Thus, if this is used, if there are regions in the unit extraction image in which symbol images cannot be detected at all, then it means alteration might have occurred.

The text region extraction image and the unit extraction image use image processing means such as region enlargement or reduction respectively for static deletion, and after the high frequency components are deleted, alter detection is carried out. Thus, stable alter detection may be done without being affected by static components.

As described above, this invention achieves the following effects.

(e) In the case where selected text strings are deleted with correction fluid and the like from a print document for illegal purposes, alteration can be detected without having the original document, and the location of alteration also can be identified.

Third Embodiment

Figure 26:
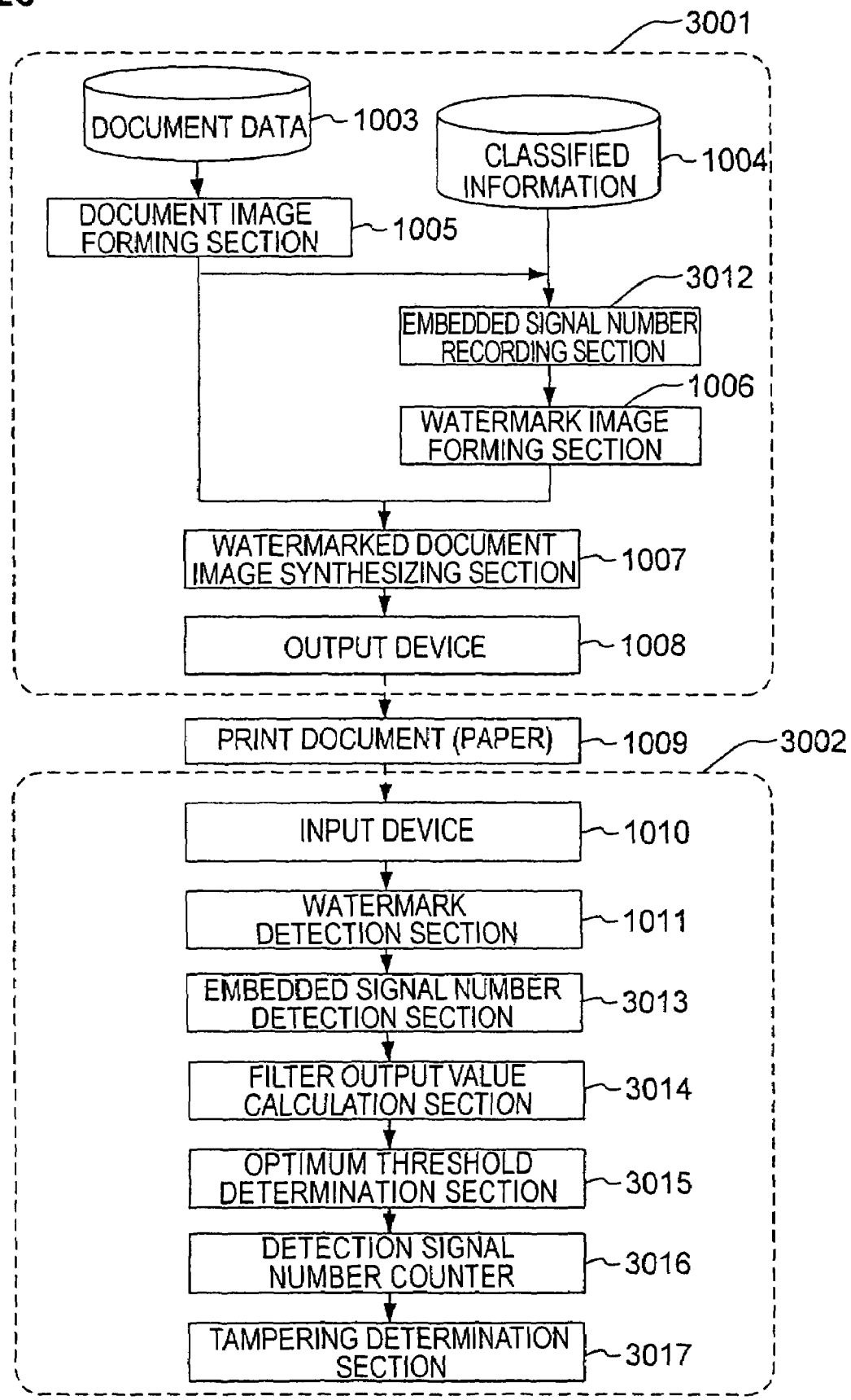
FIG. 26 is an explanatory diagram of showing the structure of the third embodiment of this invention.

FIG. 26 shows the structure of the third embodiment of this invention. The difference between this and the first embodiment is that, the electronic watermark embedding device 3001 also has the embedded signal number recording section 3012, and the electronic watermark detection device 3002 also has the embedded signal number detecting section 3013, the filter output value calculating section 3014, the optimum threshold value determining section 3015, the detection signal counter 3016 and the alter determination section 3017. Here the operation of other structural elements is the same as those of the first embodiment.

(Embedded Signal Number Recording Section 3012)

The embedded signal number recording section 3012 is the section for recording the number of signals embedded in the watermark image in the image itself. This signal number changes depending on the number of characters and layout of the document image of the original text.

(Embedded Signal Number Detecting Section 3013)

The embedded signal number detecting section 3013 decodes the numerical value recorded at the embedded signal number recording section 3012, and takes out the number of signals embedded when the watermark image is created.

(Filter Output Value Calculating Section 3014)

At the filter output value calculating section 3014, the output value of the signal detection filter corresponding to the input image is calculated and recorded for each position where there is a signal embedded.

(Optimum Threshold Determining Section 3015)

At the optimum threshold determining section 3015, the optimum value for threshold detection is calculated using the output value calculated at the filter output value calculating section 3014 and the embedded signal number obtained at the embedded signal number detecting section 3013.

(Detection Signal Counter 3016)

The detection signal counter 3016 counts the number of signals embedded in the input image using the threshold value obtained at the optimum threshold determining section 3015.

(Alter Determination Section 3017)

The alter determination section 3017 compares the correct number recorded at the embedded signal number detecting section 3013 with the signal number obtained at the detection signal counter 3016, and thereby determines whether or not there has been alteration or the like, as well as the location of the alteration.

(Embedded Signal Number Recording Section 3012)

Figure 27:
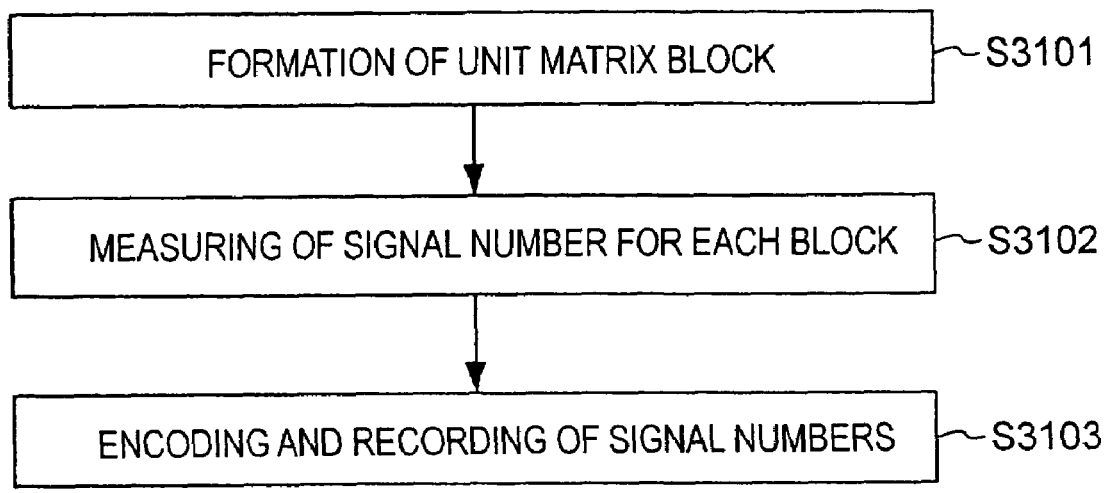
FIG. 27 is a flowchart of the operation of the embedded signal number recording section 3012.

FIG. 27 is a flowchart showing the operation of the embedded signal number recording section 3012.

(Step S3101)

Figure 28:
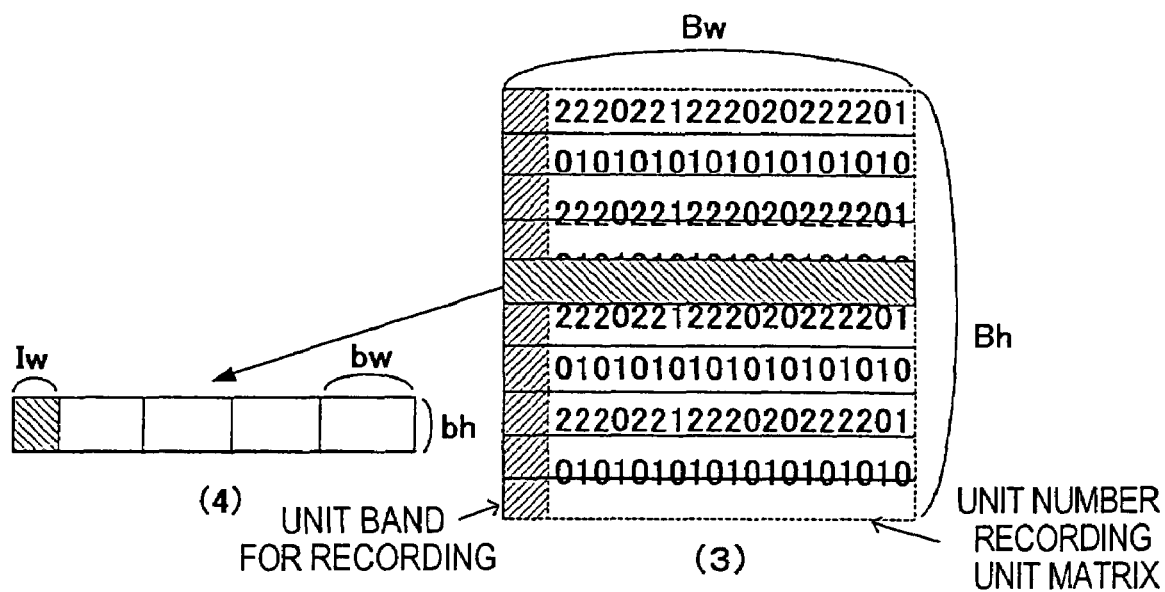
FIG. 28 is an explanatory diagram of step S3101.

FIG. 28 is an explanatory diagram of step 3101. In step3101, first the elements of Iw left ends of the unit matrix Um (FIG. 28 (2)) is used as the unit for recording of the embedding symbol unit number (FIG. 28 (3)). Next, a portion excluding the unit band for recording of the unit matrix Um is divided into (width×height=) Bw×Bh blocks. (This is called unit number recording unit matrix Nu (x,y) x=1 to Bw, y=1 to Bh.) The size of each block is the units of the size of the number of elements in unit matrix Um, (width×height=) Bw×Bh (FIG. 28 (4)).

In the case where the unit band for recording is placed in the left ends of the unit matrix Um, the parameters which can be set for the unit number recording unit matrix are the number of blocks in the width direction and the size in the height direction. The remaining number of block in the vertical direction and the size in the width direction are automatically determined from the set parameter, the width of the unit band for recording and the parameters of the unit matrix Um.

In the description below, when the size (number of elements) of the unit matrix Um is Mw×Mh, the number of blocks in the width direction is Bw=4, the size in the height direction of the block is bh=16, and the width of the unit band for recording is Iw=4. Accordingly, the number of the blocks in the vertical direction is Bh=Mh/bh=Mh/16, and the size in the width direction of the block is Bw=(Mh−Iw)/Bw=Mh−4/4.

(Step 3102 and Step S3103)

Figure 29:
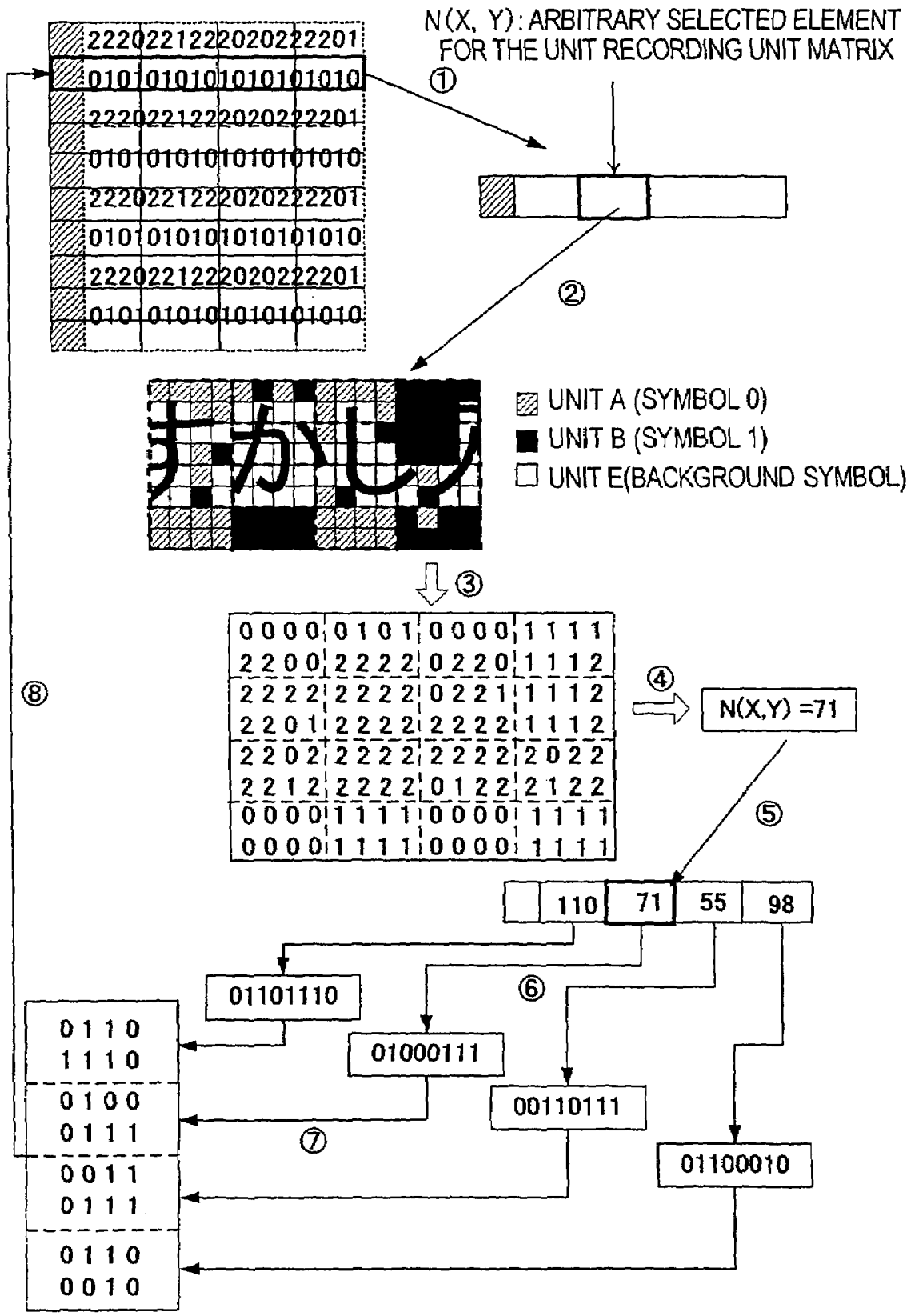
FIG. 29 is an explanatory diagram of step S3102 and step S3103.

FIG. 29 is an explanatory diagram showing step S3102 and step S3103. At step S3102, the number of symbol units including regions corresponding to each element of the unit number recording unit matrix in the unit matrix Um is calculated. The example in FIG. 29 shows a method for counting the number of the symbol units in the unit number recording unit matrix Nu (X,Y), and this method is carried out in the following steps.

Step 1: The region of the unit matrix Um corresponding to Nu (X,Y) is taken out (FIG. 29 ①②).

Step 2: The number of symbol units embedded in the region taken out at step 1 is counted (FIG. 29 ③④)

Here the counting of symbol unit embedding is the same as described in the first embodiment, and symbol units are not embedded in the text region of the input document image. In the example of FIG. 29, the number of symbol units embedded in this region is 71.

In step S3103, the number of symbol units counted at step S3102 is recording in the unit band for recording. These steps are shown below.

Step 3: N (X,Y)=71 is expressed in 2 adic numbers (FIG. 29 ⑥).

Step 4: The results from step 3 are set in the region corresponding to unit band for recording. (FIG. 29 ⑦,⑧).

In the example shown here, the number of columns bh in the unit matrix Um corresponding to one column of the unit number recording unit matrix is 16, and the width Iw of the unit band for recording is 4. Thus, the number of unit bands for recording for each column in the unit number recording unit matrix is Iw×bh=4×16=64. In addition, because the number of rows in the unit number recording unit matrix is 4, the number of unit bands for recording that is assigned to one element in the unit number recording unit matrix (called unit recording unit number) is 1w×bh (also w)=64/4=8. Thus, in first to second columns of the unit band for recording corresponding to each column in the unit number recording unit matrix, the information of the first row of the unit recording unit matrix is recorded, the second row of information is recorded in the third to fourth columns, the third row of information in the fifth to sixth columns, and the fourth row of information in the seventh to eighth columns, and thus the four rows of information respectively are recorded as unit recording unit numbers (8 bits).

In this example, the number of units is recorded, however, the ratio of the "number of symbol units" to the "maximum value of the number of signal units that can be embedded in the unit matrix Um corresponding to each element" for the unit recording unit matrix may also be recorded. The system where the ratio is recorded is effective in "the case where the range of the unit matrix Um corresponding to each element of the unit recording unit matrix is large, the number of units included therein is large, and the number of bits necessary for expressing this number exceeds the number of unit recording units" or in "the case wherein because the number of rows in the unit recording unit matrix was increased, the number of unit recording units assigned for expressing the information of one element in the unit recording unit matrix is reduced". In addition, the location of alteration is identified at the element unit of the unit recording unit matrix. Thus increasing the number of columns and rows in the unit recording unit matrix for the same input document image allows the advantage that the location of alteration on the print document can be identified more specifically, but the unit band for recording must be made equivalently larger, or the number of unit recording units must be made smaller.

It is to be noted that the unit band for recording is set in the blank portion of the document image such that it does not overlap with the text region of the document image. In addition, even if the unit band for recording is set at the right, upper or lower end of the unit matrix Um, if the subsequent process is carried out based on the assumption that "unit band for recording is above and below the document image", the same effects are obtained.

Further, a unit band for recording may be set to the left and right of the unit matrix Um, and each unit band for recording may set the same information. In this case, even if the paper is smudged and it becomes difficult to read the information of one unit band for recording, the information can be read from the other unit band for recording, and thus the process for detecting alteration and the like can be carried out stably. This is the same when the unit band for recording are above and below.

It is to be noted that because as described in the first embodiment, information on what part document image the unit band for recording is set, is recorded in the attribute recording region, and thus it is not longer necessary for this to be known in advance.

(Embedded Signal Number Detecting Section 3013)

As in the description of the second embodiment, this description assumes the following:

The size of the signal unit embedded in the document at the electronic watermark embedding device 3001 is Sw×Sh (pixels).

The number of embedded signal units=width×height=nw×nh.

There are two types of embedded symbol units, unit A and unit B.

The size of the signal unit in the input image is Siw×Sih.

Figure 30:
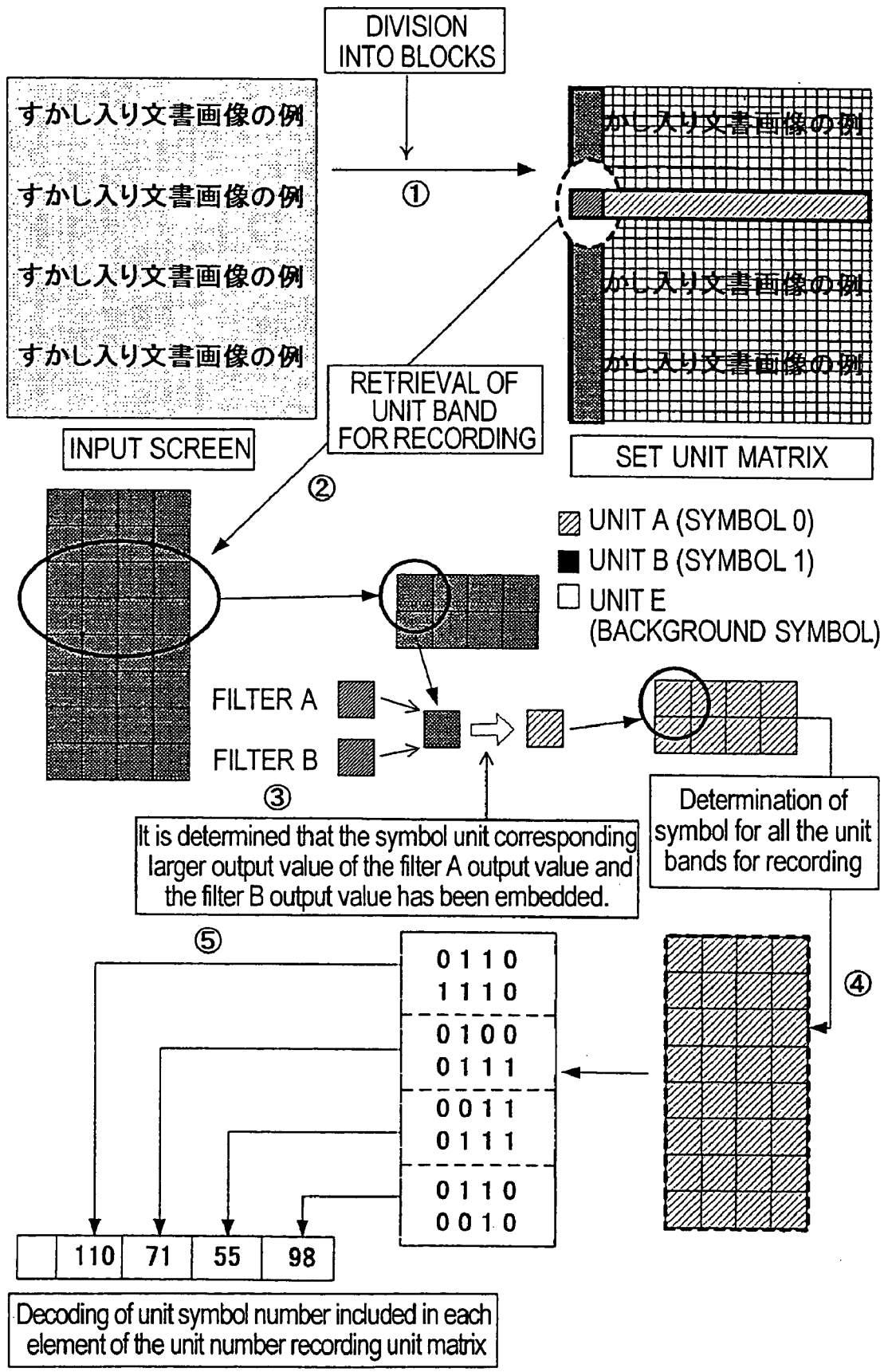
FIG. 30 is an explanatory diagram of the embedded signal number detection section 3013.

FIG. 30 is an explanatory chart of the embedded signal number detection section 3013. Detection of the embedded signal is carried out in the following steps.

Step 1: The input image is divided into Sw×Sh blocks, and the unit matrix Um is set (FIG. 30 ①).

Step 2: The portion equivalent to unit band for recording of the unit matrix Um is set (FIG. 30 (2)

Step 3: By providing signal detection filters at the unit band for recording, the embedded bit row can be returned to the original form (FIG. 30 ③④). In (FIG. 29 ③), the output values for 2 filters (filter A and filter B) are calculated for the region in the input image corresponding to each element of the unit matrix Um which is equivalent to the unit band for recording, and the symbol unit corresponding to the filter with the larger output value is considered embedded. In this example, because the output value of filter A is larger, it is determined that unit A (symbol 0) is embedded Step 4: Based on the decoded bit row, the unit number recording unit matrix is decoded (FIG. 30 ⑤).

(Filter Output Value Calculating Section 3014)

Figure 31:
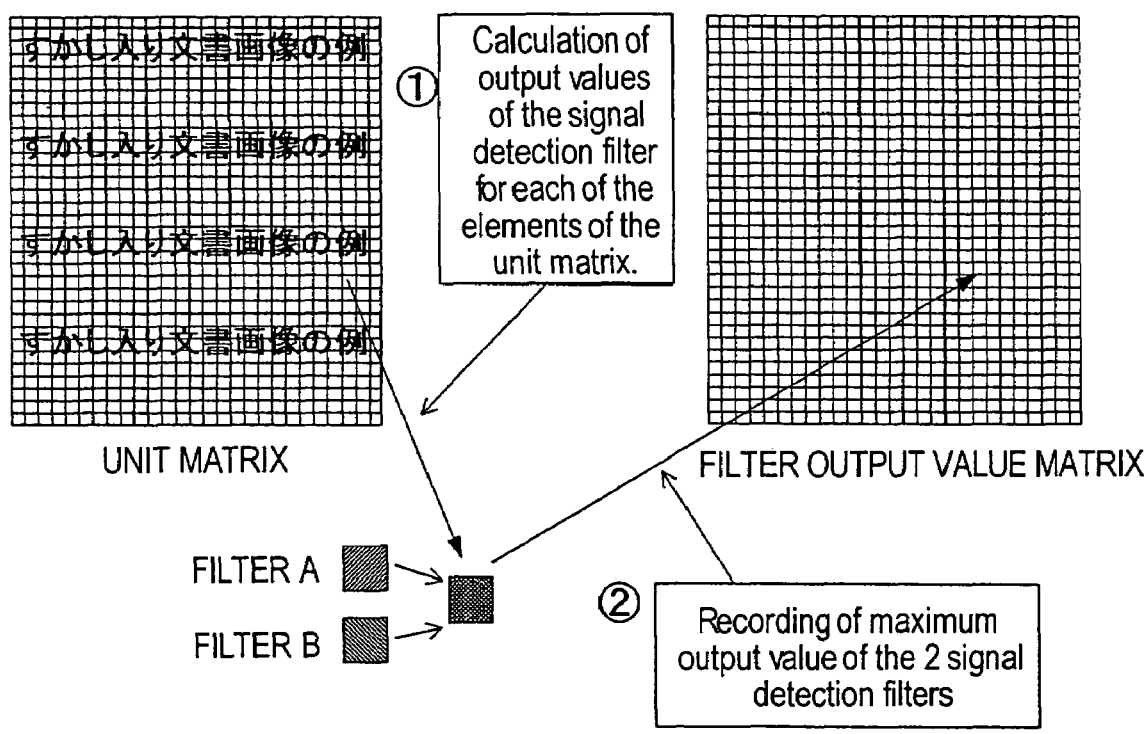
FIG. 31 is an explanatory diagram of the filter output value calculating section 3014.

FIG. 31 is an explanatory diagram of filter output value calculating section 3014.

Here the output value of the signal detection filter is recorded by the following steps, for each element of the unit matrix Um set at the embedded signal number detection section.

Step 1: The output value of the signal detection filters (filter A and filter B) for the region corresponding to selected elements of the unit matrix Um is calculated. (FIG. 30 ①). Each of the signal detection filters is shifted vertically and horizontally in the respective target region, and the output value is calculated. The larger of the maximum output value of filter A and filter B is determined.

Step 2: Step 1 is carried out for all elements of the unit matrix Um, and the output values are recorded in elements corresponding to the filter output value matrix Fm (x, y), x=1–Sw, y=1–Sh.

(Optimum Threshold Value Determining Section 3015)

Figure 32:
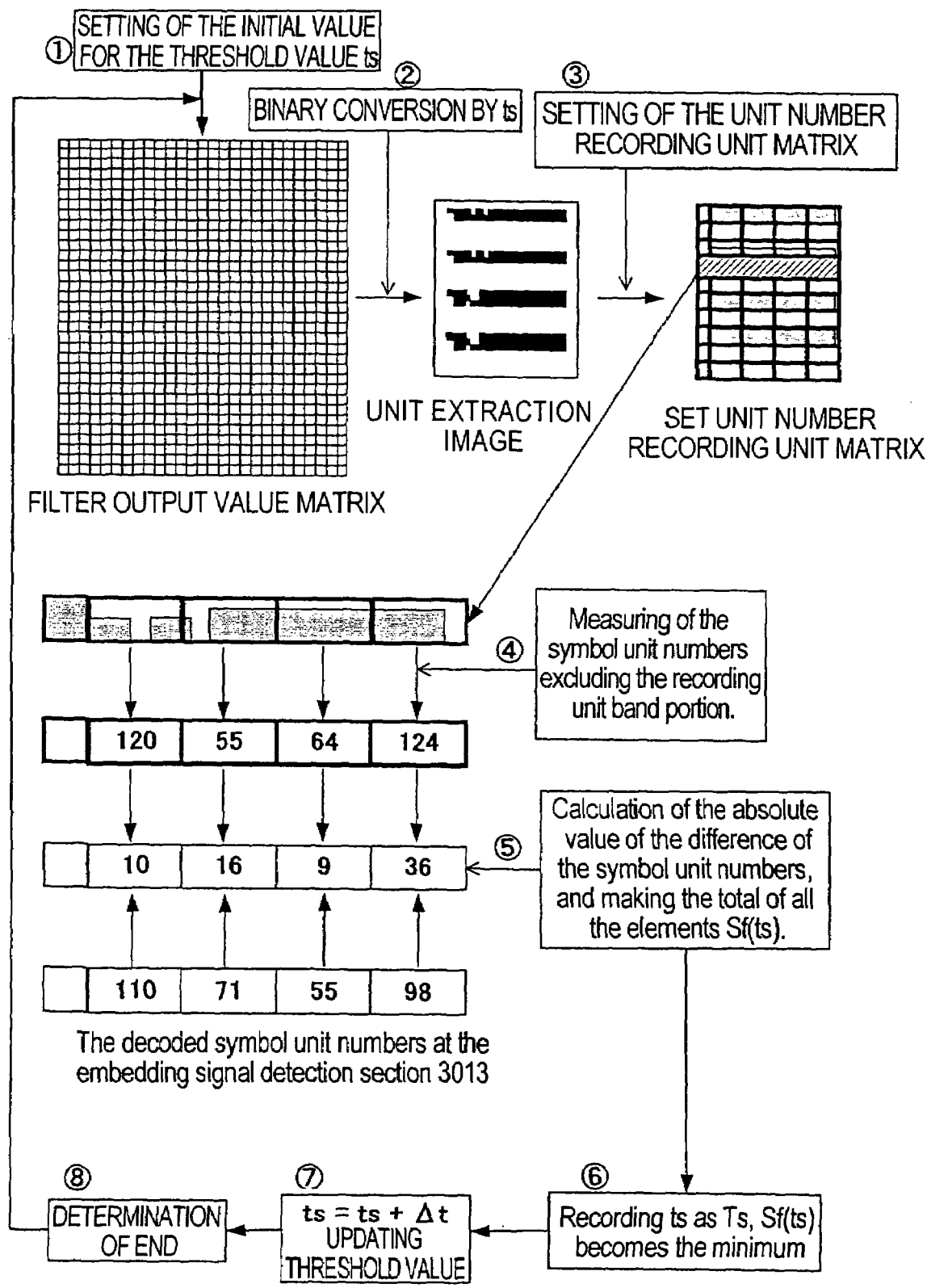
FIG. 32 is an explanatory diagram of the optimum threshold value determination section 3015.

FIG. 32 is an explanatory diagram of the optimum threshold value determining section 3015.

The threshold value is a value (called Ts) for determining whether or not unit symbols are embedded in the region of the input image corresponding to each of the regions in the unit matrix Um. If the value of arbitrary selected elements of the filter output value matrix exceeds the threshold value Ts, it is determined that a symbol unit is embedded in the positions corresponding to elements of the input image. The optimum threshold value is determined by the following steps.

Step 1: The initial value of the threshold value ts is set based on the average Fa of the elements of the filter output value matrix (signal detection filter output values) and the standard deviation Fs (FIG. 32 ①). The initial value may, for example, be ts=Fa–Fs*3.

Step 2: The filter output value matrix is binarized by ts, and the unit extraction image is thereby created. (FIG. 32 ②)

Step 3: A unit number recording unit matrix is applied to the unit extraction image (FIG. 32 ③).

Step 4: The number of symbol units in the region corresponding to each element of the unit number recording unit matrix of the unit extraction image is counted, and recorded in the unit number recording unit matrix (FIG. 32 ④).

Step 5: The number of symbol units recorded in the unit band for recording which was decoded at the embedded signal detection section 3013 and the difference from the corresponding value of the number of symbol units obtained from step 4 is calculated for each element of the unit number recording unit matrix, and the total value for all of the elements is Sf (ts) (FIG. 32 ③).

Step 6: The ts at which Sf (ts) is the smallest is recorded as Ts (FIG. 32 ③).

Step 7: Δt is added to ts to thereby update ts (FIG. 32 ⑦). Δt is a value that is preset, but it may also be calculated from standard deviation Fs (for example Δt=Fs×0.1) determined in step 1.

Step 8: The process ends if Ts is the expected value. If it does not then the process returns to step 1 (FIG. 32 ⑧) (Detection signal number counter 3016)

Figure 33:
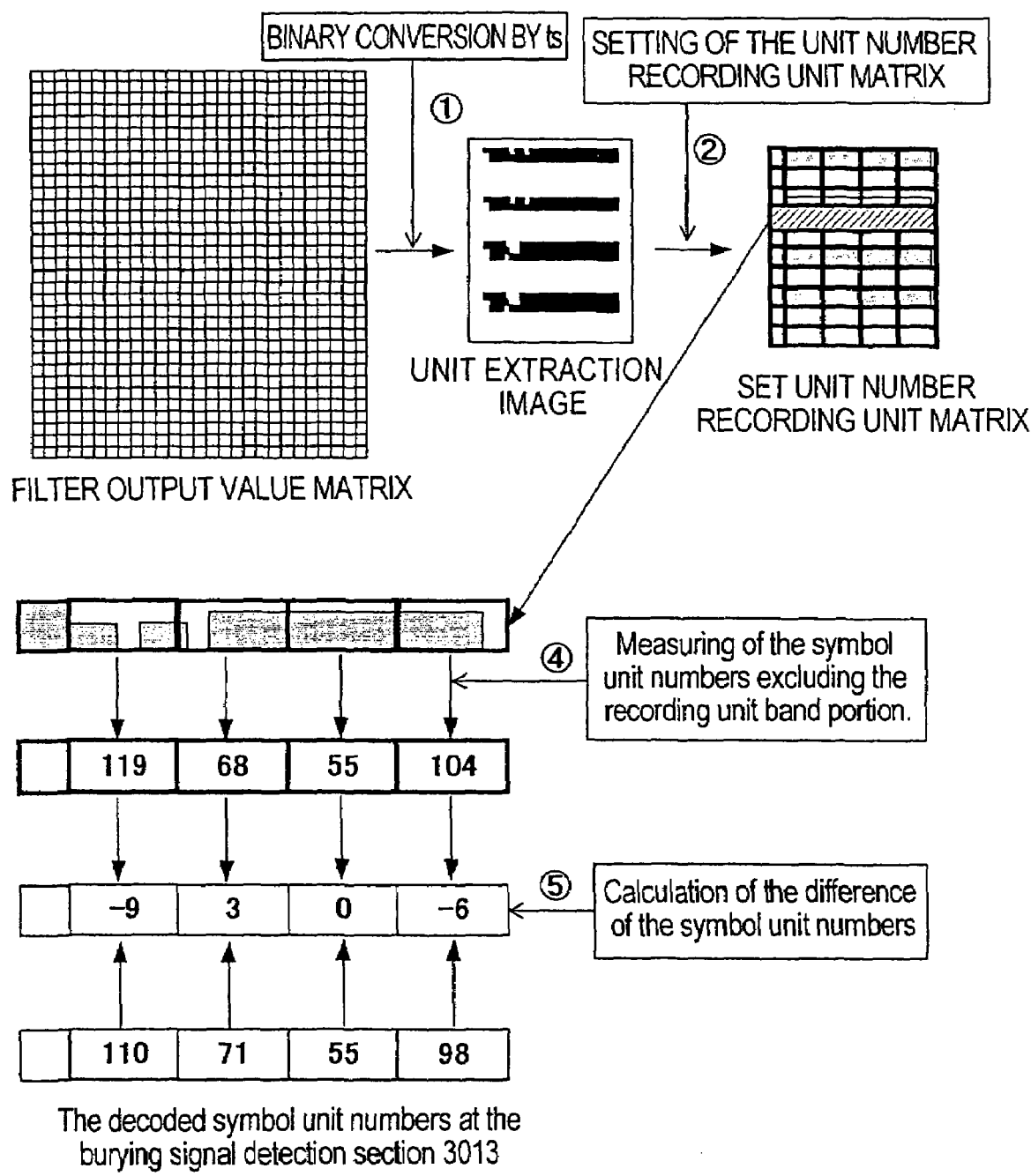
FIG. 33 is an explanatory diagram of the detection signal number section 3016.

FIG. 33 is an explanatory diagram of the detection signal number counter 3016.

In this section, the unit extraction image in which the filter output value matrix is binarized by the threshold value ts obtained from the optimum threshold determining section 3015 is used, and a process which is substantially the same as that of optimum threshold determining section 3015 is carried out.

Step 1: The filter output value matrix is binarized by ts, and the unit extraction image is thereby created. (FIG. 33 ①)

Step 2: A unit number recording unit matrix is applied to the unit extraction image (FIG. 33 ②).

Step 3: The number of symbol units in the region corresponding to each element of the unit number recording unit matrix of the unit extraction image is counted, and recorded in the unit number recording unit matrix (FIG. 33 ③).

Step 4: The number of symbol units recorded in the unit band for recording which was decoded at the embedded signal detection section 3013 and the difference D (X, Y) of the number of symbol units obtained from step 3 is calculated for each element of the unit number recording unit matrix (FIG. 33 ④). D (X, Y) in the arbitrary selected element Nu (X, Y) of the unit number recording unit matrix is determined by D (X, Y) R(X, Y)–C(X, Y), where R(X, Y) is the number of symbol units decoded from the unit band for recording, and C (X, Y) is the number of symbol units counted at step 3.

(Alter Detection Section 3017)

Alter determination in selected elements N (X, Y) of the unit number recording unit is carried out using D (X, Y).

(1) Alteration where text is added: D (X, Y)>TA (TA is a positive integer) "In the case where the number of symbols detected is less than the number of symbol units recorded, it is determined that detection is impossible because text was written on unit symbols that were originally embedded.

(2) Alteration where text is deleted: D (X, Y)<TC (TC is a negative integer) "In the case where the number of symbols detected is more than the number of symbol units recorded, unit symbols that were not originally embedded are detected. After text is deleted with correction fluid or the like, there is undesired content in the image other than the text region and this is determined to be substance filtered by the signal detection filter. This is for detecting alteration involving text deletion which could not be detected in the second embodiment.

As described above, this embodiment achieves the following effects.

(f) The document image is divided into a number of blocks, and by recording the number of symbol units embedded in each block, alteration in the block unit can be detected, and the location of the alteration can also be identified.

(g) By recording the number of signals embedded, the optimum threshold value for signal detection and alter detection can be determined.

(h) In the case where text strings are added to blank portions of the printed document, or where suitable selected text strings are deleted using correction fluid or the like illegally, alteration and location of the alteration can be detected even without having the original document.

Preferable embodiments of the electronic watermark embedding device, the electronic watermark detection device, electronic watermark embedding method, and electronic watermark detecting method of the present invention are described above with reference to the accompanying drawings, but this invention is not limited to these examples. Various modifications or alterations can be easily made therefrom by those skilled in the art without departing from the scope of the techniques described in the claims, and it is to be understood that these modifications and alterations are also within the scope of this invention.

For example, after the processes of the third embodiment, the processes of the first embodiment may be carried out, and the threshold value Ts obtained at the optimum threshold determining section 3015 maybe used as the threshold value Ts for step 1203 and step 1204 (FIG. 18) of the first embodiment. As a result, the accuracy of detection of embedding information is improved as compared to when Ts is a fixed value.

Similarly, after the processes of the third embodiment, the processes of the second embodiment may be carried out, and the threshold value Ts obtained at the optimum threshold determining section 3015 maybe used as the threshold value Ts for the second embodiment. As a result, the accuracy of detection of alteration is improved as compared to when Ts is a fixed value.

As described above, the main effects of this invention are as follows.

(a) By embedding a meaningful signal (codeword signal) only in regions that do not overlap with text, referring to the arrangement of text in the document image to be watermarked, embedding of classified information can be ensured regardless of the form of the original document.

(b) The same number of inverse symbol units are put in regions with no codeword symbol embedded, and thus at the time of detection, it can be determined with certainty that there are no symbols embedded.

(c) When the embedding information is being detected, symbol determination is done by the total output value for 2 filters corresponding to a particular region, and thus the information detection accuracy is kept high.

(d) By setting attribute recording regions in which attribute information such as the embedded signal number are set in the four corners of the region where the signal is embedded, hardware errors at the output device have no effect at the time when the classified information is being detected, and the attribute information can be extracted correctly, and the accuracy of the subsequent detection is improved.

Further, by the working examples described in the above embodiments of this invention, the following effects are also obtained.

(e) In the case where mainly selected text strings are illegally deleted with correction fluid and the like from a print document, alteration can be detected without having the original document, and the location of alteration also can be identified.

(f) The document image is divided into a number of blocks, and by recording the number of symbol units embedded in each block, alteration can be detected in the block unit, and the location of the alteration can also be identified.

(g) By recording the number of signals embedded, the optimum threshold value for signal detection and alter detection can be determined.

(h) In the case where text strings are added to the blank portion of the printed document, or where suitable selected text strings are deleted using correction fluid or the like for the purposes of fraud, alteration and location of the alteration can be detected even without the original document.

What is claimed is:

1. An electronic watermark embedding device for embedding classified information in a document image by watermarking comprising:

a watermark image forming section for creating a watermark image based on the classified information while referring to the document image, wherein the watermark image forming section calculates an embedding region for embedding a dot pattern in which a prescribed symbol can be identified by a prescribed filter, and determines whether or not the proportion of text region to the embedding region is less than or equal to a prescribed threshold value, for the document image, and if the proportion of the document region is less than or equal to the prescribed threshold value, a prescribed number of first dot patterns (symbol units) in which a first symbol formed of at least a portion of the classified information is identifiable, is embedded in a region where the embedding region and the text region do not overlap.

2. An electronic watermark embedding device described in claim 1, wherein the document image is divided into a plurality of embedding regions, and a determination is made for each of the embedding regions, as to whether or not the proportion of the text region is less than or equal to the prescribed threshold value by the watermark image forming section.

3. An electronic watermark embedding device described in claim 1, wherein a prescribed number at a time of a plurality of types of the symbol units are embedded in a region where the embedding region whose proportion of text region portion exceeds the prescribed value and does not overlap with the text region by the watermark image forming section.

4. An electronic watermark embedding device described in claim 1 wherein a second dot pattern (background unit) in which a second symbol that is unrelated to the first symbol is embedded in the region where the embedding region and the text region overlap.

5. An electronic watermark embedding device described in claim 1, wherein the dot arrangement rule of the symbol units is such that the dots form a wave.

6. An electronic watermark embedding device described in claim 1, wherein a prescribed symbol can be identified by a prescribed filter in the symbol unit, by changing the direction andlor the wavelength of the dot wave by the symbol unit.

7. An electronic watermark embedding device described in claim 1, further comprising: a watermarked image synthesizing section for creating the watermarked document image in which the document image and the watermark image are superposed, and an output device for printing the watermarked document image by the watermarked image synthesizing section.

8. An electronic watermark embedding device described in claim 7, wherein each type of attribute information at the time of embedding and/or detection of the classified information, is recorded at portions at the four corners of the watermarked document image.

9. An electronic watermark embedding device described in claim 1, further comprising an embedded signal number recording section for recording the number of the symbol units and back ground units to be embedded in the watermark image, in the blank region of the watermark image.

10. An electronic watermark detection device for detecting classified information embedded in the document image by watermarking, wherein:
   the document image is divided into a plurality of embedding regions for embedding dot patterns in which a prescribed symbol can be identified by a prescribed filter;
   the classified information is embedded by embedding in each embedding region, a first dot pattern (symbol unit) in which a first symbol formed of at least a portion of the classified information is identifiable, or a second dot pattern (background unit) in which a second symbol is unrelated to the first symbol;
   a watermark detection section for detecting the classified information, in which the watermark detection section:
   includes a plurality of types of filters which can identify a prescribed symbol from the dot pattern; and
   matches each of the embedding regions using the plurality of types of filter, and detects in the embedding region with the one filter that has a output value that is much larger than the output values for all the other filters, at least a portion of the classified information corresponding to the one filter;
a text deletion alteration detection section, wherein the text deletion alteration detection section:
   creates a text region extraction image in which the pixel value for the text region is 0, and the pixel value of the for the background region is 1, by using a prescribed threshold value to make the document image with classified information embedded binary;
   creates a symbol unit extraction image in which the pixel value of region of the document image with the classified information embedded in which the symbol unit cannot be detected is 0, and the pixel value of the region in which the symbol unit can be detected is 1; and
   detects alteration of the watermarked document image by comparing the text region extraction image with the symbol unit extraction image.

11. An electronic watermark detection device for detecting classified information embedded in the document image by watermarking, wherein:
   the document image is divided into a plurality of embedding regions for embedding dot patterns in which a prescribed symbol can be identified by a prescribed filter;
   the classified information is embedded by embedding in each embedding region, a first dot pattern (symbol unit) in which a first symbol formed of at least a portion of the classified information is identifiable, or a second dot pattern (background unit) in which a second symbol is unrelated to the first symbol;
   a watermark detection section for detecting the classified information, in which the watermark detection section:
   includes a plurality of types of filters which can identify a prescribed symbol from the dot pattern; and
   matches each of the embedding regions using the plurality of types of filter, and detects in the embedding region with the one filter that has a output value that is much larger than the output values for all the other filters, at least a portion of the classified information corresponding to the one filter;
   an embedded signal detection section for detecting the number of symbol units embedded when the classified information is embedded in the document image;
   a filter output value detection section for calculating the output value of the prescribed filter and recording the value in each of the embedding regions for the input image;
   optimum value determination section for calculating the optimum value for detecting the number of symbol units embedded in the watermark image from the value calculated in the embedded signal number detection section and the value calculated at the filter output value calculation section;
   a detection signal counter for detecting the number of symbol units actually embedded in the watermarked document image; and
   a alter determination section for determining whether or not the watermarked document image has been altered with, by comparing the value detected at the filter output value calculation section with the value counted at the signal detection counter.

12. An electronic watermark detection device described in claim 11, wherein the embedded signal number detecting section detects the number of symbol units embedded when the classified information is embedded, from the information recorded in the blank region of the watermarked document image by the embedded signal number detecting section.

13. An electronic watermark detection device described in claim 11, wherein the difference between the value detected at the embedded signal number detection section and the value calculated at the filter output value calculation section is totaled for all of the embedding regions, and the threshold value is set such that the total value is the smallest.

14. An electronic watermark image embedding method for embedding classified information in a document image by watermarking comprising:
   a first step of dividing the document image into a plurality of embedding regions for embedding a dot pattern in which a prescribed symbol can be identified by a prescribed filter;
   a second step of determining whether or not the proportion for the text region is less than or equal to a prescribed threshold value for each of the embedding regions;
   a third step of embedding of a prescribed number of first dot patterns (symbol unit) in which a first symbol formed of at least a portion of the classified information is identifiable in a region where the embedding region and the text region do not overlap, in the case where the proportion of the text region is less than or equal to the prescribed threshold value;
   a fourth step of embedding a plurality of different types of the symbol units at a prescribed number in a region where the embedding region and the text region do not overlap in the case where the proportion of the text region exceeds the prescribed threshold value;
   a fifth step of embedding a second dot pattern (background unit) in which a second symbol is unrelated to the first symbol in a region where embedding region and the text region overlaps.

* * * * *